US012591344B2

(12) United States Patent
Zhang et al.

(10) Patent No.: US 12,591,344 B2
(45) Date of Patent: Mar. 31, 2026

(54) TOUCH PANEL, ELECTRONIC DEVICE, AND TOUCH SYSTEM

(71) Applicant: HUAWEI TECHNOLOGIES CO., LTD., Shenzhen (CN)

(72) Inventors: Junyong Zhang, Dongguan (CN); Zesheng Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/991,742

(22) Filed: Dec. 23, 2024

(65) Prior Publication Data

US 2025/0199649 A1      Jun. 19, 2025

Related U.S. Application Data

(63) Continuation of application No. PCT/CN2023/101731, filed on Jun. 21, 2023.

(30) Foreign Application Priority Data

Jun. 25, 2022    (CN) ......................... 202210728181.4

(51) Int. Cl.
G06F 3/044        (2006.01)
G06F 3/0354      (2013.01)

(52) U.S. Cl.
CPC ........ G06F 3/0446 (2019.05); G06F 3/03545 (2013.01)

(58) Field of Classification Search
CPC ........................... G06F 3/0446; G06F 3/03545
See application file for complete search history.

(56) References Cited

U.S. PATENT DOCUMENTS

| 2016/0349873 A1 | 12/2016 | Zhang et al. | |
| 2021/0333908 A1* | 10/2021 | Zhang | G06F 3/0448 |
| 2024/0419284 A1* | 12/2024 | Ma | G06F 3/0443 |

FOREIGN PATENT DOCUMENTS

| CN | 105093025 A | 11/2015 |
| CN | 108803945 A | 11/2018 |
| CN | 109729728 A | 5/2019 |
| CN | 111475046 A | 7/2020 |
| CN | 113485576 A | 10/2021 |
| WO | 2012096210 A1 | 7/2012 |

OTHER PUBLICATIONS

Lee et al., CN 109729728 A machine translation, May 7, 2019 (Year: 2019).*

* cited by examiner

*Primary Examiner* — Peter D Mcloone

(57)        ABSTRACT

A touch panel, an electronic device, and a touch system are provided. The touch panel includes a plurality of repeating units arranged in an array, each repeating unit includes N first electrodes and M second electrodes that are alternately arranged in a first direction, and both N and M are integers greater than or equal to 3. First electrodes in repeating units that are adjacent in a second direction in the plurality of repeating units are connected in one-to-one correspondence, and extend in the second direction, and the second direction is perpendicular to the first direction. The M second electrodes in the repeating unit are connected through a conductive bridge in the first direction, and second electrodes in repeating units that are adjacent in the first direction in the plurality of repeating units are connected to each other.

14 Claims, 16 Drawing Sheets

Touch electrode 100

Touch panel 200

15:33

Friday, October 19

Power supply
module 202

Electronic device 20

Display 201
(touch panel 200)

Active stylus 203

Active stylus 502

Touch panel 500

Electronic device 501

Metal grid 804

First direction

Second
direction

Repeating unit 601

First electrode 701

Conductive
bridge 703

Second
electrode
702

L

Second
electrode
702

Repeating unit 601

TOUCH PANEL, ELECTRONIC DEVICE, AND TOUCH SYSTEM

CROSS-REFERENCE TO RELATED APPLICATIONS

This application is a continuation of International Application No. PCT/CN2023/101731, filed on Jun. 21, 2023, which claims priority to Chinese Patent Application No. 202210728181.4, filed on Jun. 25, 2022. The disclosures of the aforementioned applications are hereby incorporated by reference in their entireties.

TECHNICAL FIELD

The present disclosure relates to the field of touch technologies, and in particular, to a touch panel, an electronic device, and a touch system.

BACKGROUND

Existing organic light-emitting diode (Organic Light-Emitting Diode, OLED) touch panels are roughly classified into three touch modes: out of cell (Out Of Cell): a touch module (that is, a touch panel) is separated from a liquid crystal panel; in-cell (In-Cell): a touch panel function is embedded into a liquid crystal pixel; and on-cell (On-Cell): a touch panel function is embedded between a color filter substrate and a polarizer. Currently, mainstream terminal devices tend to be lighter and thinner, and the in-cell touch mode is usually used.

For an in-cell touch panel, because the touch panel is also a display substrate, a touch electrode structure and a detection circuit electrically connected to the touch electrode structure are located on the display substrate. The touch electrode structure includes a plurality of touch electrode patterns. When a finger of a user approaches the touch electrode structure, the detection circuit can detect that an induction amount on a touch electrode pattern at a location of the finger of the user changes, and the location at which the induction amount changes may be determined as a touch location. Similarly, the detection circuit can also detect that an induction amount on a touch electrode pattern changes when a touch tool (for example, an active stylus) approaches the touch electrode structure, to determine a touch location.

However, a contact area between the touch tool and a touch electrode is far less than a contact area between the finger of the user and a touch electrode. In addition, a pattern of the touch electrode in the touch panel is usually of a rhombic structure, and the touch electrode of the rhombic structure has a sharp size change and electrode area change in an electrode extension direction (for example, in a horizontal or vertical direction along a screen), causing uneven distribution of touch signals. Such uneven distribution greatly affects user experience for a touch tool for which higher writing precision is required. For example, when a user performs a touch operation on the touch panel by using a touch tool such as an active stylus, if the active stylus approaches an edge region of a touch electrode pattern, a change of an induction amount on the touch electrode pattern is small. As a result, the detection circuit may not be able to accurately determine a touch location based on the change of the induction amount. Consequently, local signal distribution is distorted, and linearity corresponding to the active stylus is poor.

Therefore, how to accurately determine a touch location of a touch tool to improve linearity of the touch tool is an urgent problem to be resolved.

SUMMARY

Embodiments of the present disclosure provide a touch panel, an electronic device, and a touch system, to improve linearity of a touch tool.

According to a first aspect, an embodiment of the present disclosure provides a touch panel. The touch panel may include a plurality of repeating units arranged in an array, the repeating unit includes N first electrodes and M second electrodes, the N first electrodes and the M second electrodes are alternately arranged in a first direction, and both N and M are integers greater than or equal to 3. First electrodes in repeating units that are adjacent in a second direction in the plurality of repeating units are connected in one-to-one correspondence, and extend in the second direction, and the second direction is perpendicular to the first direction. The M second electrodes in the repeating unit are connected through a conductive bridge in the first direction, and second electrodes in repeating units that are adjacent in the first direction in the plurality of repeating units are connected to each other.

In the conventional technology, a contact area between an active stylus and a touch electrode (equivalent to the first electrode and the second electrode) in a touch panel is far less than a contact area between a finger of a user and a touch electrode. In addition, the current touch electrode has a sharp size change and electrode area change in an electrode extension direction (for example, in a horizontal or vertical direction along a screen) in the touch panel, causing uneven distribution of touch signals. Consequently, linearity of the active stylus is poor, and touch effect is affected. Therefore, in embodiments of this application, the touch panel includes the plurality of repeating units arranged in an array, and the repeating unit may be understood as a minimum repeating touch unit in the touch panel. The repeating unit includes a plurality of first electrodes and a plurality of second electrodes that are alternately arranged in the first direction. A quantity of first electrodes and a quantity of second electrodes are both greater than or equal to 3, and the first electrodes and the second electrodes are alternately arranged, so that different electrodes in the repeating unit can be alternately and evenly distributed. This avoids a sharp size change and electrode area change of a rhombic touch electrode in an electrode extension direction. Therefore, signal uniformity of a touch tool during touch is improved, and linearity of the touch tool is improved. In addition, the M second electrodes in the repeating unit are connected through the conductive bridge in the first direction, the conductive bridge may enable the M second electrodes connected through the conductive bridge in the repeating unit to form a signal channel in the first direction, and the signal channel may be used to transmit a touch signal. In addition, second electrodes in any two repeating units that are adjacent in the first direction in the plurality of repeating units are connected to each other, so that the second electrodes extend in the first direction, and then the plurality of repeating units distributed in an array form a plurality of signal channels in the first direction. First electrodes in any two repeating units that are adjacent in the second direction in the plurality of repeating units are connected in one-to-one correspondence, so that the first electrodes extend in the second direction, and then the plurality of repeating units distributed in an array form a plurality of signal channels in the second direction. Signal channels corresponding to the first electrode and the second electrode on the touch panel are in two directions perpendicular to each other. For example, an extension direction of the first electrode and a corresponding signal channel are in a row direction, and an extension direction of the second electrode and a corresponding signal channel are in a column direction. Therefore, electrodes (that is, signal channels) in different extension directions on the touch panel may be used to accurately determine a touch location of a user or a touch tool on the touch panel.

In a possible implementation, M=N+1, and in the first direction, all boundaries of the repeating unit are second electrodes.

In embodiments of this application, a quantity of second electrodes in the repeating unit is one more than a quantity of first electrodes, so that all boundaries of the repeating unit in the first direction are second electrodes. Then, in the plurality of repeating units arranged in an array, second electrodes in two repeating units that are adjacent in the first direction can be directly electrically connected, thereby reducing a quantity of conductive bridges, and avoiding nonuniformity of touch signals caused by a sharp area change of the electrode at a partial location.

In a possible implementation, both the first electrode and the second electrode are metal grid electrodes.

In embodiments of this application, all touch electrodes (that is, the first electrode and the second electrode) in the touch panel are metal grid electrodes. The metal grid electrode is a metal electrode surrounding a light emitting pixel, and may be embedded into a display panel, so that a terminal device is lighter and thinner.

In a possible implementation, a first gap exists between the first electrode and an adjacent second electrode in the repeating unit.

In embodiments of this application, the first gap exists between the first electrode and the adjacent second electrode. The first gap enables the first electrode and the second electrode to be insulated from each other (that is, there is no electrical connection), and can reduce a capacitance difference between the first electrode and the second electrode, to improve uniformity of capacitive sensing between electrodes in the touch panel, thereby improving linearity of the touch tool during a slide operation on the touch panel. A part or all of the first gap may be filled with an insulation medium or a metal grid with a fracture (a metal grid that cannot be electrically connected).

In a possible implementation, a second gap exists between second electrodes in the repeating units that are adjacent in the second direction in the plurality of repeating units.

In embodiments of this application, the second gap exists between the second electrodes in the two repeating units that are adjacent in the second direction. The gap may enable insulation between the second electrodes in the two repeating units that are adjacent in the second direction, thereby increasing a quantity of electrode channels, in the second direction, of the plurality of repeating units arranged in an array (that is, a quantity of signal channels corresponding to the second electrode in the second direction). A part or all of the second gap may be filled with an insulation medium or a metal grid with a fracture (a metal grid that cannot be electrically connected).

In a possible implementation, the first direction includes a column direction or a row direction.

In embodiments of this application, the first direction may include the column direction or the row direction. In addition, because the second direction is perpendicular to the first direction, the corresponding second direction may include the row direction or the column direction. For example, when the first direction is the row direction, the second direction is the column direction.

In a possible implementation, the first electrode includes a plurality of first convex portions and a plurality of first concave portions, and the second electrode includes a plurality of second convex portions and a plurality of second concave portions. The first convex portion and the second concave portion are disposed in correspondence, the first concave portion and the second convex portion are disposed in correspondence, every two adjacent first convex portions in the first electrode are connected through one first concave portion, and every two adjacent second concave portions in the second electrode are connected through one second convex portion.

In embodiments of this application, the first electrode and the second electrode in the repeating unit are correspondingly provided with convex portions and concave portions, so that the first electrode and the second electrode are evenly distributed in the repeating unit in a sawtooth shape, thereby ensuring uniformity of capacitive sensing of the touch panel. In addition, to prevent a sharp change in an electrode area in the repeating unit, the conductive bridge is usually configured to connect second convex portions of two second electrodes that are adjacent in the first direction in the N second electrodes in the repeating unit.

In a possible implementation, the first convex portion and the second concave portion and/or the first concave portion and the second convex portion are rectangular.

In embodiments of this application, the first convex portion and the second concave portion and/or the first concave portion and the second convex portion are correspondingly set to be rectangular. Compared with a rhombic electrode, this avoids a sharp change in an electrode area, improves uniformity of capacitive sensing in an electrode extension direction, and improves linearity of the touch tool.

In a possible implementation, in the first electrode, the plurality of first convex portions have a same width in the first direction, and the plurality of first concave portions have a same width in the first direction; and in the second electrode, the plurality of second convex portions have a same width in the first direction, and the plurality of second concave portions have a same width in the first direction.

In embodiments of this application, the plurality of first convex portions have the same width in the first direction, and the plurality of first concave portions have the same width in the first direction. In the second electrode, the plurality of second convex portions have the same width in the first direction, and the plurality of second concave portions have the same width in the first direction. In this way, both the first electrode and the second electrode are strip-shaped electrodes, thereby improving touch signal consistency between the first electrode and the second electrode.

In a possible implementation, a width of at least one of the N first electrodes is different from a width of a remaining first electrode, and the width of the first electrode is the width of the plurality of first convex portions in the first direction.

In embodiments of this application, widths of the N first electrodes are not completely consistent. In the first direction, a width corresponding to a first electrode far away from a boundary of the repeating unit is usually less than a width corresponding to a first electrode close to the boundary of the repeating unit. Setting the width of the electrode can improve an envelope shape when the touch tool slides on the touch panel. This helps improve writing effect of the touch tool such as an active stylus on the touch panel.

In a possible implementation, a width of at least one of the M second electrodes is different from a width of a remaining second electrode, and the width of the second electrode is the width of the plurality of second concave portions corresponding to the second electrode in the first direction.

In embodiments of this application, widths of the M second electrodes are not completely consistent. In the first direction, a width corresponding to a second electrode far away from a boundary of the repeating unit is usually greater than a width corresponding to a second electrode close to the boundary of the repeating unit. Setting the width of the electrode can improve an envelope shape when the touch tool slides on the touch panel. This improves linearity of the touch tool such as an active stylus during sliding on the touch panel.

In a possible implementation, N=3, M=4, the N first electrodes include a first electrode S1, a first electrode S2, and a first electrode S3, and the M second electrodes include a second electrode K1, a second electrode K2, a second electrode K3, and a second electrode K4. The second electrode K1, the second electrode K2, the second electrode K3, and the second electrode K4 are alternately arranged with the first electrode S1, the first electrode S2, and the first electrode S3 in sequence in the first direction. A width of the first electrode S2 is less than a width of the second electrode K2, the width of the second electrode K2 is equal to a width of the second electrode K3, the width of the second electrode K3 is less than a width of the first electrode S1, and the width of the first electrode S1 is equal to a width of the first electrode S3. A sum of a width of the second electrode K1 and a width of the second electrode K4 is greater than the width of the first electrode S1, or a sum of a width of the second electrode K1 and a width of the second electrode K4 is equal to the width of the second electrode K3.

In embodiments of this application, three first electrodes and four second electrodes are alternately arranged in sequence. A width corresponding to a first electrode far away from a boundary in the first direction is less than a width corresponding to a first electrode close to the boundary in the first direction, and a width corresponding to a second electrode far away from a boundary in the first direction is greater than a width corresponding to a second electrode close to the boundary in the first direction. Setting the widths of the first electrode and the second electrode can improve an envelope shape when the touch tool slides on the touch panel. This helps improve writing effect of the touch tool such as an active stylus on the touch panel.

According to a second aspect, an embodiment of this application provides an electronic device. The electronic device includes a flexible display, the flexible display includes a touch panel, the electronic device receives, through the touch panel, a touch operation performed on the flexible display, and the touch panel includes the touch panel according to any one of the possible implementations provided in the first aspect.

In a possible implementation, the electronic device further includes an active stylus, and the active stylus is configured to perform the touch operation on the flexible display.

According to a third aspect, an embodiment of this application provides a touch system. The system includes an electronic device and an active stylus, the electronic device includes a touch panel, a touch operation performed by the active stylus on the electronic device is received through the touch panel, and the touch panel includes the touch panel according to any one of the possible implementations provided in the first aspect.

BRIEF DESCRIPTION OF DRAWINGS

To describe technical solutions in embodiments of the present disclosure or in the background more clearly, the following describes the accompanying drawings used in embodiments of the present disclosure or in the background.

DESCRIPTION OF EMBODIMENTS

Figure 1:
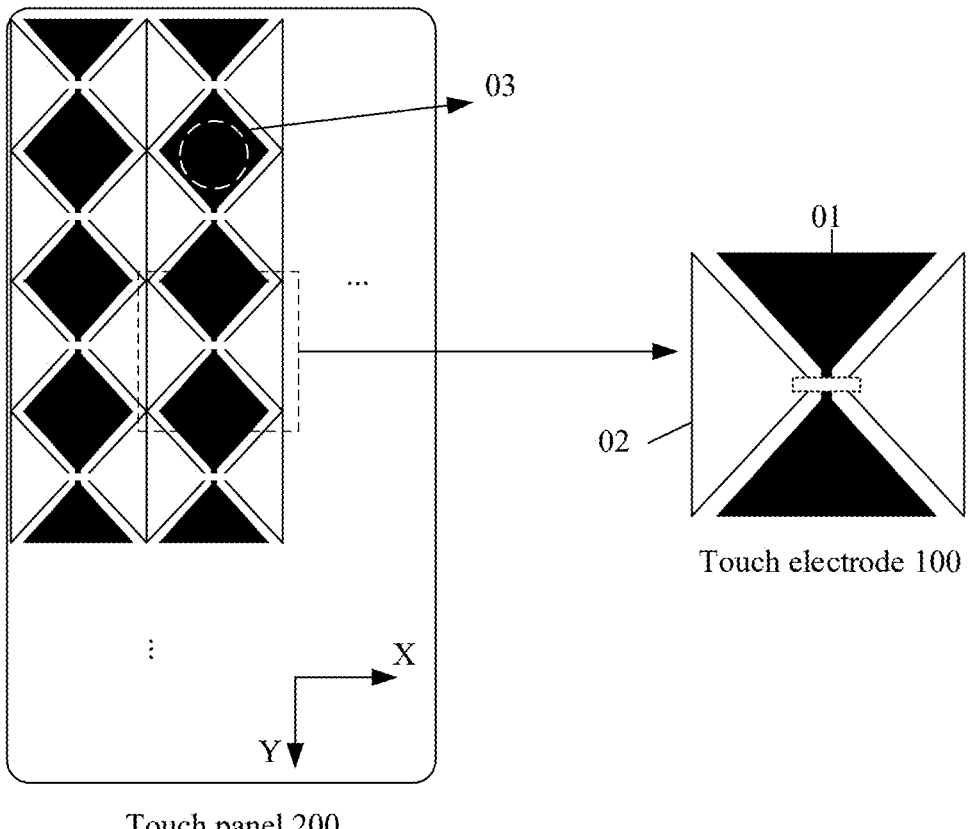
FIG. 1 is a diagram of a touch panel and a touch electrode in an existing electronic device according to an embodiment of this application.

The following describes embodiments of the present disclosure with reference to accompanying drawings in embodiments of the present disclosure.

The terms "first", "second", and the like in the specification, claims, and accompanying drawings of this application are used to distinguish between different objects, but are not used to describe a specific sequence. In addition, the terms "include" and "have" and any variations thereof are intended to cover non-exclusive inclusion. For example, a process, method, system, product, or device that includes a series of steps or units is not limited to the listed steps or units, but optionally further includes an unlisted step or unit, or optionally further includes another inherent step or unit for the process, method, product, or device.

It should be understood that, in this application, "at least one (item)" refers to one or more, and "a plurality of" refers to two or more. The term "and/or" describes an association relationship of associated objects, and indicates that three relationships may exist. For example, "A and/or B" may indicate the following three cases: Only A exists, only B exists, and both A and B exist. A and B may be singular or plural. The character "/" generally indicates an "or" relationship between associated objects. "At least one of the following items (pieces)" or a similar expression thereof refers to any combination of these items, including a single item (piece) or any combination of a plurality of items (pieces). For example, at least one of a, b, or c may represent a, b, c, "a and b", "a and c", "b and c", or "a, b, and c", where a, b, and c may be singular or plural.

The "embodiment" mentioned in this specification means that specific features, structures, or characteristics described with reference to the embodiment may be included in at least one embodiment of this application. Appearance of the phrase at various locations in the specification does not necessarily refer to a same embodiment, or an independent or alternative embodiment mutually exclusive with another embodiment. A person skilled in the art may explicitly and implicitly understand that the embodiments described in this specification may be combined with other embodiments.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by using a local process and/or a remote process based on a signal having one or more data packets (for example, data from two components interacting with another component in a local system, a distributed system, and/or across a network, such as the internet interacting with other systems by using the signal).

First, for case of understanding embodiments of this application, the following analyzes a to-be-resolved technical problem and an application scenario in embodiments of this application.

In the conventional technology, for an in-cell touch panel, a touch electrode structure includes a plurality of touch electrode patterns. When a finger of a user approaches the touch electrode structure, a detection circuit can detect that an induction amount on a touch electrode pattern at a location of the finger of the user changes, and the location at which the induction amount changes may be determined as a touch location. Similarly, the detection circuit can also detect that an induction amount on a touch electrode pattern changes when a touch tool (for example, an active stylus) approaches the touch electrode structure, to determine a touch location.

Refer to FIG. 1. FIG. 1 is a diagram of a touch panel 200 and a touch electrode in an existing electronic device according to an embodiment of this application. As shown in FIG. 1, a plurality of touch electrodes 100 are repeatedly arranged on the touch panel 200 to form a plurality of rhombic electrodes. The touch electrodes 100 include a longitudinal electrode 01 and a transverse electrode 02. In a Y-axis direction and an X-axis direction, the longitudinal electrode 01 and the transverse electrode 02 each have a structural feature of a gradually increasing or decreasing electrode size. In addition, an electrode size change rate even reaches 700% to 1000% in an extension direction of the electrode (an extension direction of the longitudinal electrode 01 is the Y-axis direction, and an extension direction of the transverse electrode 02 is the X-axis direction). Such an electrode structure in which there is a sharp size change and electrode area change in an electrode extension direction is not conducive to improving touch effect of a touch tool. There is a difference between electrode areas of touch electrodes 100 at different locations (for example, in a central region of a region 03 in the touch panel 200 shown in FIG. 1, the longitudinal electrode 01 and the transverse electrode 02 have a large difference in electrode areas, and are far away from each other). Therefore, when a touch tool slides in a horizontal or vertical direction of the touch panel 200, signal uniformity between the touch electrode 100 and the touch tool is very poor, and a consistency difference percentage of signals received by the longitudinal electrode 01 and the transverse electrode 02 at a same location is also relatively large. Consequently, touch coordinates of the touch tool on the touch panel 200 have a relatively severe offset, and linearity of the touch tool is poor.

Therefore, this application provides a touch panel. The touch panel includes a plurality of repeating units arranged in an array, and the repeating unit may be understood as a minimum repetition touch unit in the touch panel. The repeating unit includes a plurality of first electrodes and a plurality of second electrodes that are alternately arranged in a first direction. A quantity of first electrodes and a quantity of second electrodes are both greater than or equal to 3, and the first electrodes and the second electrodes are alternately arranged, so that different electrodes in the repeating unit can be alternately and evenly distributed. This avoids a sharp size change and electrode area change of a rhombic touch electrode in an electrode extension direction. Therefore, signal uniformity of a touch tool during touch is improved, and linearity of the touch tool is improved.

In addition, M second electrodes in the repeating unit are connected through a conductive bridge in the first direction, the conductive bridge may enable the M second electrodes connected through the conductive bridge in the repeating unit to form a signal channel in the first direction, and the signal channel may be used to transmit a touch signal. In addition, second electrodes in any two repeating units that are adjacent in the first direction in the plurality of repeating units are connected to each other, so that the second electrodes extend in the first direction, and then the plurality of repeating units distributed in an array form a plurality of signal channels in the first direction. In addition, first electrodes in any two repeating units that are adjacent in a second direction in the plurality of repeating units are connected in one-to-one correspondence, so that the first electrodes extend in the second direction, and then the plurality of repeating units distributed in an array form a plurality of signal channels in the second direction. Signal channels corresponding to the first electrode and the second electrode on the touch panel are in two directions perpendicular to each other. Therefore, electrodes (that is, signal channels) in different extension directions on the touch panel may be used to accurately determine a touch location of a user or a touch tool on the touch panel. For a specific implementation, refer to the following related embodiments. Details are not described in this embodiment of this application.

Based on the proposed technical problem, to facilitate understanding of embodiments of the present disclosure, the following describes embodiments of an electronic device and a related system in embodiments of this application.

Figure 2:
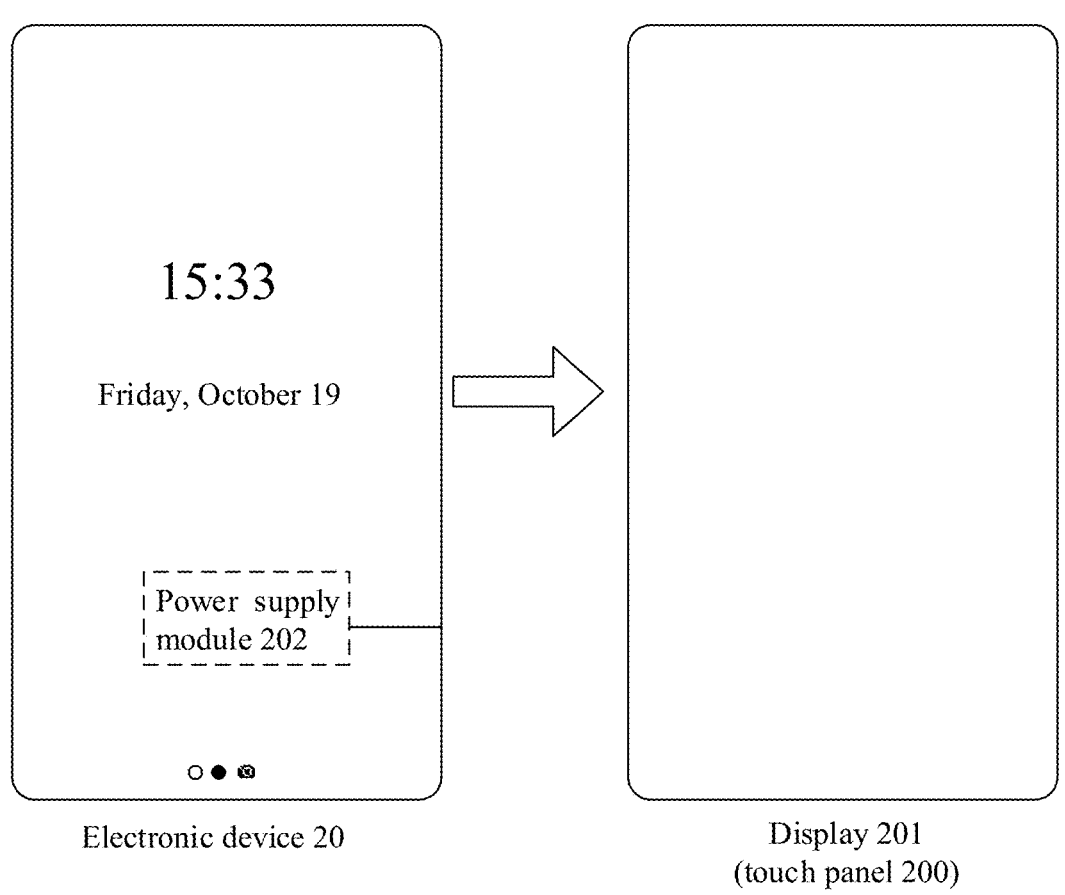
FIG. 2 is a diagram of an electronic device according to an embodiment of the present disclosure.

Refer to FIG. 2. FIG. 2 is a diagram of an electronic device according to an embodiment of the present disclosure. As shown in FIG. 2, the electronic device 20 in this application may include a display 201 in FIG. 2, and optionally, may further include a power supply module 202 and an active stylus 203.

The display 201 is a product or a component that has a display function and a touch function. For example, the display may display an image. The display 201 may be a flexible display. The flexible display may be embedded with a touch panel, for example, the touch panel 200 shown in FIG. 1, so that the electronic device may receive, through the touch panel, a touch operation performed by a user or a touch tool on the display 201. For related descriptions of the touch panel, refer to the following embodiments. Details are not described in this embodiment of this application.

The power supply module 202 may supply power to the electronic device and components included in the electronic device. For example, the power supply module 202 may be configured to supply power to the display 201 and the touch panel included in the display 201, so that the display can display an image and receive a related touch operation.

It should be noted that the display includes a display panel and the touch panel. That the touch panel is embedded in the display is equivalent to that the touch panel is embedded in the display panel. The embedding mode is merely a possible implementation provided in this embodiment of this application. An installation mode of the touch panel is not limited in this embodiment of this application. For example, touch panels are roughly classified into three installation modes: out of cell (Out Of Cell): a touch module (that is, a touch panel) is separated from a liquid crystal pixel (that is, a display panel); in-cell (In-Cell): a touch panel function is embedded into a liquid crystal pixel; and on-cell (On-Cell): a touch panel function is embedded between a color filter substrate and a polarizer (that is, outside a display panel). Currently, mainstream terminal devices tend to be lighter and thinner, and the in-cell touch mode is usually used.

It should be further noted that a material of the display is not specifically limited in this embodiment of this application. For example, the display may be a quantum dot light-emitting diode (quantum dot light-emitting diodes, QLED) display apparatus, may be an active-matrix organic light-emitting diode (active-matrix organic light-emitting diode, AMOLED) display apparatus, or the like.

Figure 3:
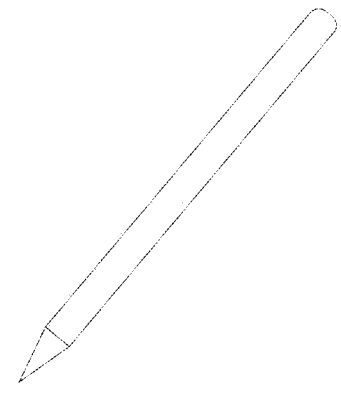
FIG. 3 is a diagram of an active stylus according to an embodiment of the present disclosure.

Optionally, the electronic device may further include an active stylus. Refer to FIG. 3. FIG. 3 is a diagram of an active stylus according to an embodiment of the present disclosure. As shown in FIG. 3, the active stylus is also referred to as an active pen, a capacitive pen, an active capacitive stylus, a stylus, or the like. Different from a passive stylus, the active stylus includes a signal transmission module, configured to send a signal. For example, a touch electrode of the touch panel in the display 201 may receive a signal sent by the active stylus and measure touch coordinates, to implement a related touch operation (for example, tap or slide). In addition, the active stylus may implement effect similar to an actual nib thickness. In addition, the active stylus may further include a pressure sensor, so that the stylus can sense a change of a writing force of a user, to change a thickness of a handwriting based on the change of the writing force, thereby achieving excellent user experience.

Figure 4:
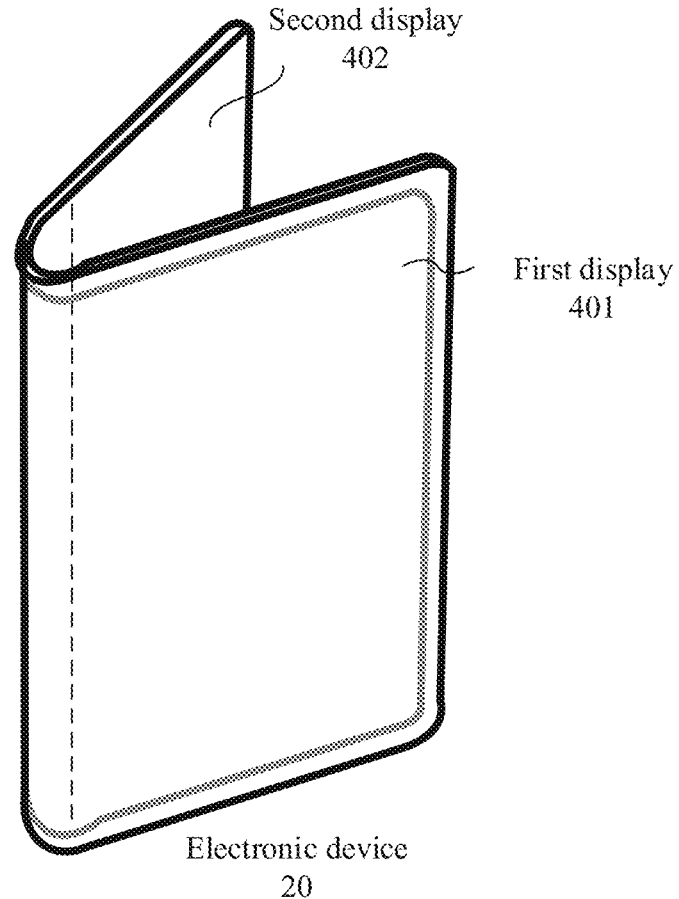
FIG. 4 is a diagram of another electronic device according to an embodiment of the present disclosure.

It may be understood that the electronic device in embodiments of this application may be a device including a display with at least one touch panel. A quantity and a type of displays included in the electronic device are not specifically limited in embodiments of this application. For example, refer to FIG. 4. FIG. 4 is a diagram of another electronic device according to an embodiment of the present disclosure. As shown in FIG. 4, the electronic device 20 may include two displays (for example, a first display 401 and a second display 402). Both the first display 401 and the second display 402 include a touch panel in the following related embodiments, so that the electronic device receives, through the touch panel, a touch operation performed on the first display 401 and/or the second display 402.

Figure 5:
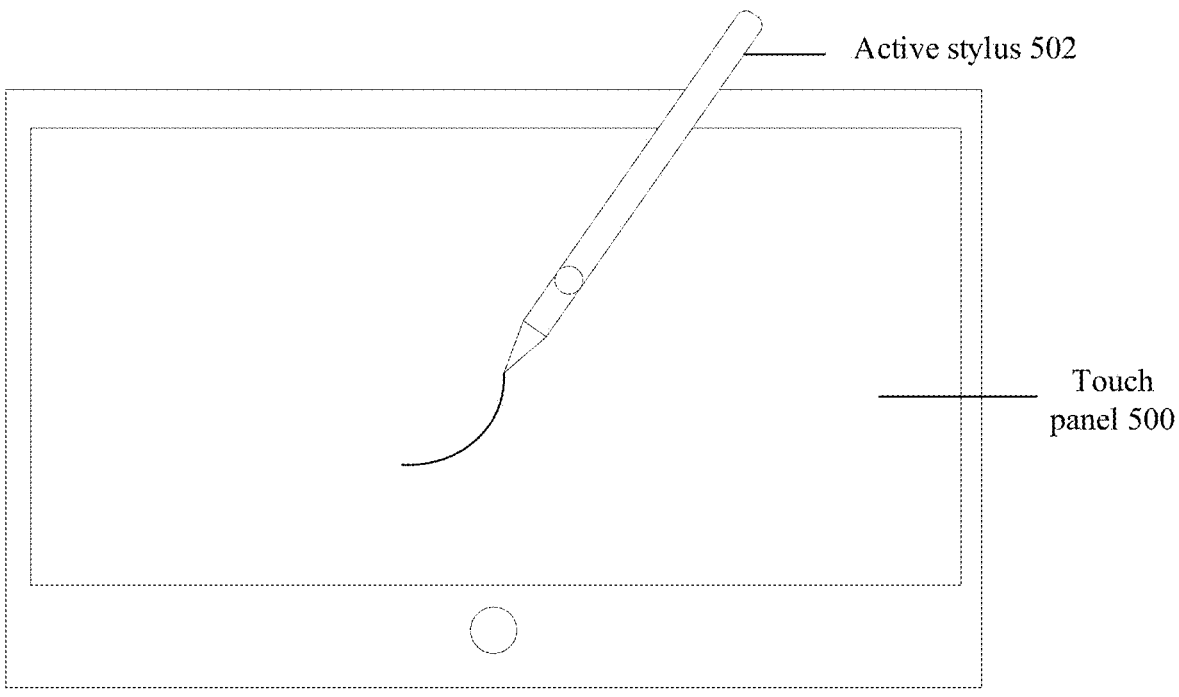
FIG. 5 is a diagram of a touch system according to an embodiment of the present disclosure.

Refer to FIG. 5. FIG. 5 is a diagram of a touch system according to an embodiment of the present disclosure. As shown in FIG. 5, the touch system may include an electronic device 501 and an active stylus 502.

The electronic device 501 includes a touch panel 500, and a touch operation performed by the active stylus 502 on the electronic device 501 is received through the touch panel 500. It may be understood that for related descriptions of the touch panel 500, refer to the following embodiments. Details are not described in this embodiment of this application.

As shown in FIG. 5, the electronic device 501 may be a device with the touch panel 500. A type of the electronic device is not specifically limited in this embodiment of this application. For example, the electronic device 501 may be a notebook computer, a smartphone (for example, a foldable phone), a tablet computer, a touchable television, or a touchable display.

In addition, for a related function and structure of the electronic device, refer to the related descriptions in the embodiment shown in FIG. 2. Details are not described in this embodiment of this application.

Based on the embodiments of the electronic device and the related system, for ease of understanding of embodiments of the present disclosure, the following describes a touch panel in embodiments of this application.

The touch panel may include a plurality of repeating units arranged in an array, the repeating unit includes N first electrodes and M second electrodes, the N first electrodes and the M second electrodes are alternately arranged in a first direction, the first direction includes a column direction or a row direction, and both N and M are integers greater than or equal to 3. First electrodes in repeating units that are adjacent in a second direction in the plurality of repeating units are connected in one-to-one correspondence, and extend in the second direction, and the second direction is perpendicular to the first direction. The M second electrodes in the repeating unit are connected through a conductive bridge in the first direction, and second electrodes in repeating units that are adjacent in the first direction in the plurality of repeating units are connected to each other.

Figure 6:
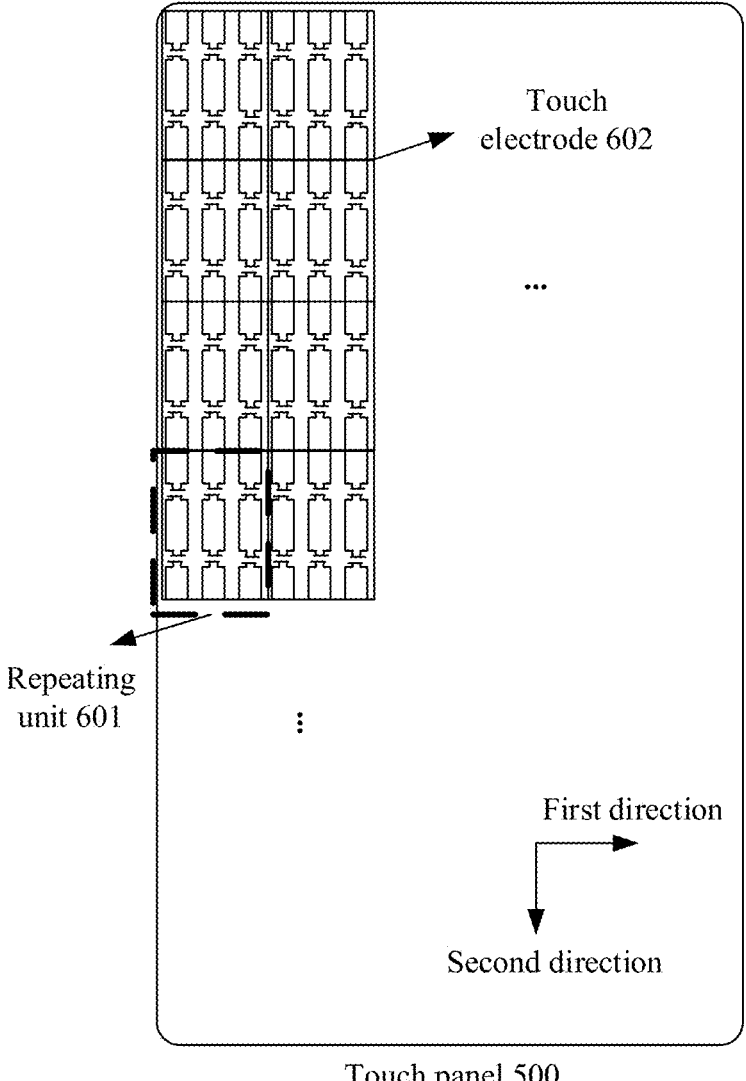
FIG. 6 is a diagram of a touch panel and a touch electrode on the touch panel according to an embodiment of the present disclosure.

Refer to FIG. 6. FIG. 6 is a diagram of a touch panel 500 and a touch electrode on the touch panel 500 according to an embodiment of the present disclosure. As shown in FIG. 6, the touch panel 500 includes a plurality of repeating units 601 arranged in an array, and each of the repeating units 601 includes a touch electrode 602 mentioned in this embodiment. In this embodiment of this application, the touch electrode 602 includes N first electrodes and M second electrodes. The N first electrodes and the M second electrodes may be respectively used as transmit electrodes and receive electrodes of the touch panel 500, to transmit a touch signal.

The repeating unit 601 may be understood as a minimum repeating touch unit in the touch panel 500. A size of the repeating unit 601 may be 4*4 mm, and a shape of the repeating unit 601 is a square. It should be noted that the shape and the size of the repeating unit 601 are not specifically limited in this embodiment of this application. For example, in some other embodiments, the repeating unit 601 may alternatively be in a rectangular shape or another regular shape, and the size of the repeating unit 601 may be adjusted based on a size of the touch panel 500. In addition, a width of the first electrode in the first direction is less than a half of a width of the repeating unit 601 in the first direction.

In addition, it should be further noted that a shape and an area of the touch panel 500 need to be consistent with those of a touch region on a display. The shape and the size of the touch panel 500 are not specifically limited in this application. For example, the shape and the area of the touch panel 500 shown in FIG. 6 are consistent with a shape and an area of a touch region on the display 201 shown in FIG. 2. For another example, in a foldable screen having two displays, sizes of the two displays are inconsistent, touch regions are inconsistent, and then sizes of corresponding touch panels 500 are also inconsistent. For another example, when the display of the electronic device is in a circular shape, an elliptic shape, or another regular or irregular shape, the touch panel 500 may have a shape different from the shape of the display when the touch panel 500 keeps consistent with the touch region.

Figure 7:
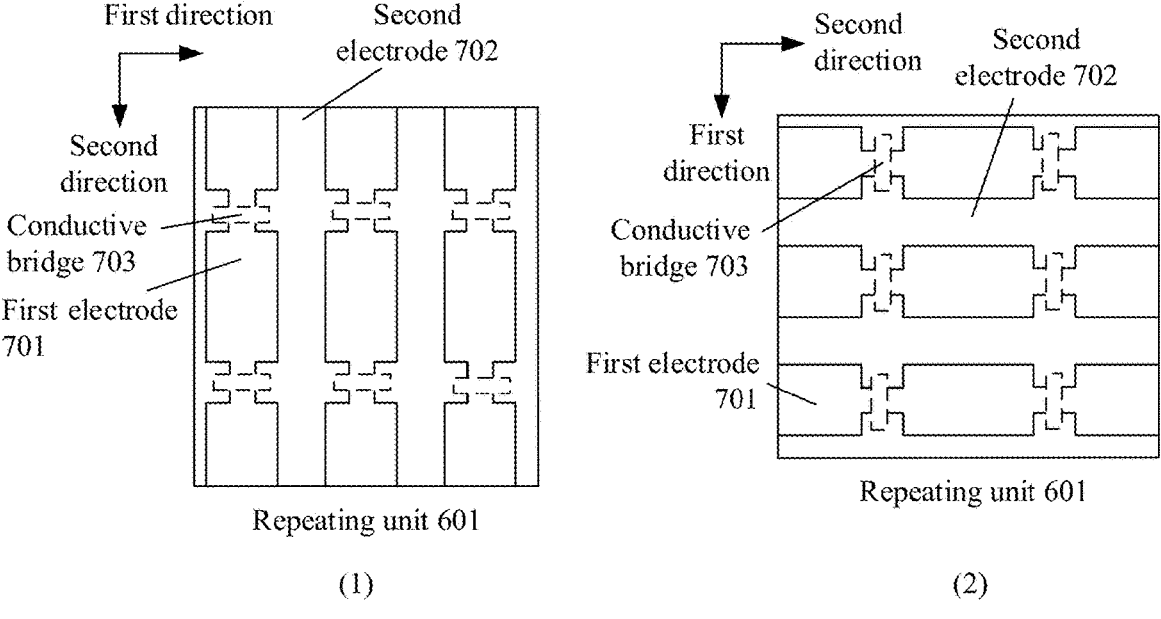
FIG. 7 is an electrode diagram of touch electrodes in several types of repeating units according to an embodiment of the present disclosure.

Refer to FIG. 7. FIG. 7 is an electrode diagram of touch electrodes in several types of repeating units according to an embodiment of the present disclosure. As shown in (1) in FIG. 7, the repeating unit 601 may be any repeating unit 601 on the touch panel shown in FIG. 6. The repeating unit 601 includes N first electrodes 701 and M second electrodes 702. The N first electrodes and the M second electrodes are alternately arranged in the first direction. The M second electrodes in the repeating unit 601 are connected through a conductive bridge 703 in the first direction.

Figure 8A:
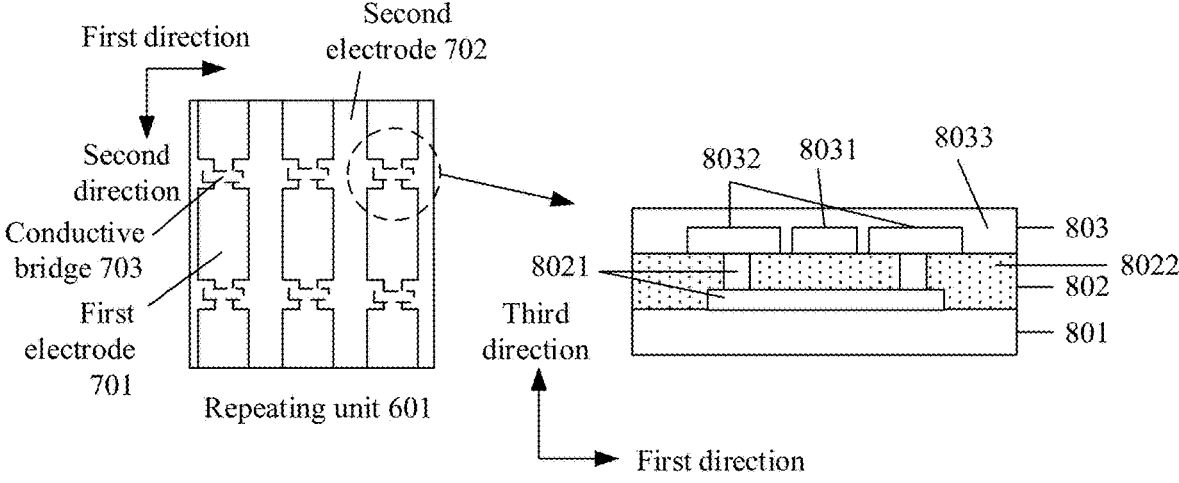
FIG. 8A is a diagram of a structure of a conductive bridge in a repeating unit according to an embodiment of the present disclosure.

In a third direction, the conductive bridge 703 is at a different layer from the N first electrodes 701 and the M second electrodes 702, and the N first electrodes 701 and the M second electrodes 702 are at a same layer. It should be noted that the third direction is perpendicular to both the first direction and the second direction. One conductive bridge 703 in the repeating unit 601 shown in (1) in FIG. 7 is used as an example. Refer to FIG. 8A. FIG. 8A is a diagram of a structure of a conductive bridge in a repeating unit according to an embodiment of the present disclosure. As shown in FIG. 8A, the repeating unit 601 may include a substrate 801, a conductive bridge layer 802, and an electrode layer 803 that are sequentially stacked in the third direction. The conductive bridge layer 802 includes a conductive bridge medium 8021 and a first insulation medium 8022, and the electrode layer 803 includes a first electrode layer 8031, a second electrode layer 8032, and a second insulation medium layer 8033. The first electrode layer 8031 is configured to prepare the first electrode 701, the second electrode layer 8032 is configured to prepare the second electrode 702, and the conductive bridge medium 8021 is used as the conductive bridge 703, is configured to connect two adjacent second electrode layers 8032 in the electrode layer 803, and is not connected to the first electrode layer 8031, so that the M second electrodes 702 in the repeating unit 601 are connected through the conductive bridge in the first direction.

In addition, to ensure that the M second electrodes 702 in the repeating unit 601 are connected in the first direction, there are at least M−1 conductive bridges 703, so that any two adjacent second electrodes 702 in the M second electrodes 702 can be connected.

The substrate 801 may be a related material for thin film encapsulation (Thin Film Encapsulation, TFE). Both the first insulation medium 8022 and the second insulation medium layer 8033 are insulation materials. This is not specifically limited in this embodiment of this application. For example, the first insulation medium 8022 and the second insulation medium layer 8033 may be silicon nitride or an organic insulation medium.

It should be noted that the conductive bridge layer 802 shown in FIG. 8A is closer to the substrate 801 than the electrode layer 803 in the third direction, and this is merely an example structure provided in this embodiment of this application. In some other possible embodiments, in the third direction, the conductive bridge layer 802 is farther away from the substrate 801 than the electrode layer 803. For example, the conductive bridge 703 is located above the N first electrodes 701 and the M second electrodes 702. Therefore, a specific location of the conductive bridge layer 802 is not specifically limited in this embodiment of this application.

In addition, as shown in FIG. 8A, a conductive material of the conductive bridge medium 8021 may be a single-layer metal material or a multi-layer metal material, for example, single-layer metal such as Mo (molybdenum) or multi-layer metal such as Ti/Al/Ti (titanium/aluminum/titanium) or Mo/Al/Mo (molybdenum/aluminum/molybdenum). This is not specifically limited in this embodiment of this application.

The electrode layer 803 may also be referred to as an effective touch pattern (touch pattern) layer. Conductive materials of the N first electrodes 701 and the M second electrodes 702 may be a single-layer metal material or a multi-layer metal material, for example, single-layer metal such as Mo (molybdenum) or multi-layer metal such as Ti/Al/Ti (titanium/aluminum/titanium) or Mo/Al/Mo (molybdenum/aluminum/molybdenum). This is not specifically limited in this embodiment of this application. Conductive materials of the first electrode 701 and the second electrode 702 may be the same or different, and conductive materials of the conductive bridge 703 and the second electrode 702 may be the same or different. This is not specifically limited in this embodiment of this application.

Figure 8B:
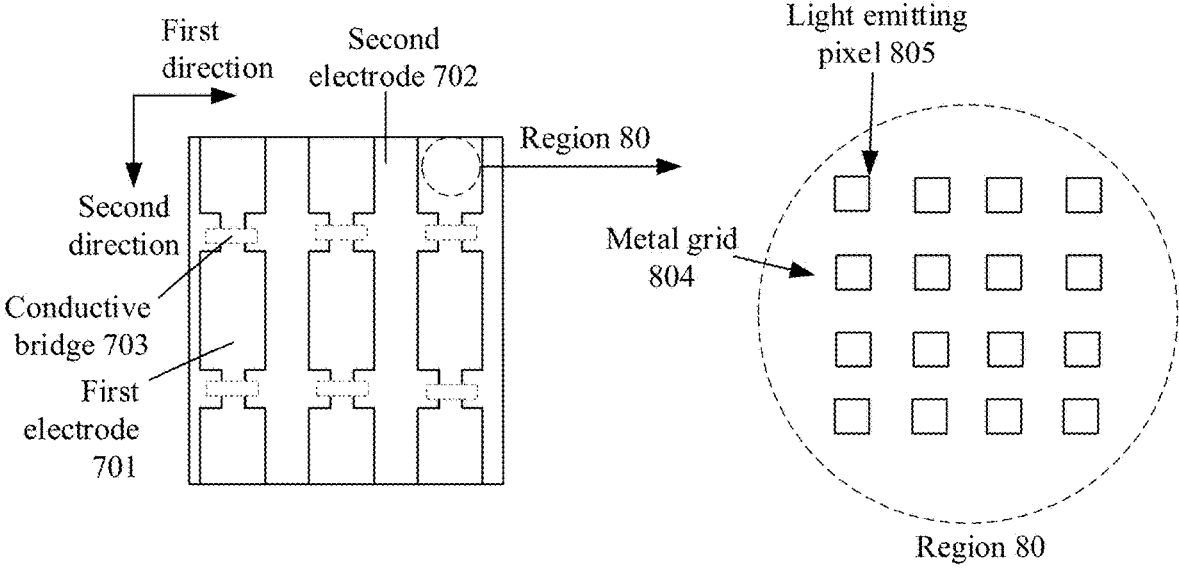
FIG. 8B is a diagram of a structure of a metal grid electrode according to an embodiment of this application.

Optionally, both the first electrode and the second electrode are metal grid electrodes. All touch electrodes in the touch panel are metal grid electrodes. The metal grid electrode is a metal electrode surrounding a light emitting pixel, and may be embedded into a display panel, so that a terminal device is lighter and thinner. The touch electrode includes the first electrode and the second electrode. It should be noted that, because the touch panel is embedded in the display, the touch electrode in the touch panel surrounds the light emitting pixel. The light emitting pixel may be used to output an image signal, to form an image on the display. Refer to FIG. 8B. FIG. 8B is a diagram of a structure of a metal grid electrode according to an embodiment of this application. As shown in FIG. 8B, any region 80 of the first electrode 701 is formed by a metal grid 804 surrounding a light emitting pixel 805.

It should be further noted that the first direction includes a column direction or a row direction, and the second direction is perpendicular to the first direction. The column direction and the row direction are a column direction and a row direction of the plurality of repeating units arranged in an array, or may be a vertical direction and a horizontal direction along the touch panel. For example, for the repeating unit 601 shown in (1) in FIG. 7, when the first direction is a row direction, the second direction is a column direction. For the repeating unit 601 shown in (2) in FIG. 7, when the first direction is a column direction, the second direction is a row direction. The row direction includes a horizontal direction along the touch panel, and the column direction includes a vertical direction along the touch panel.

Figure 9:
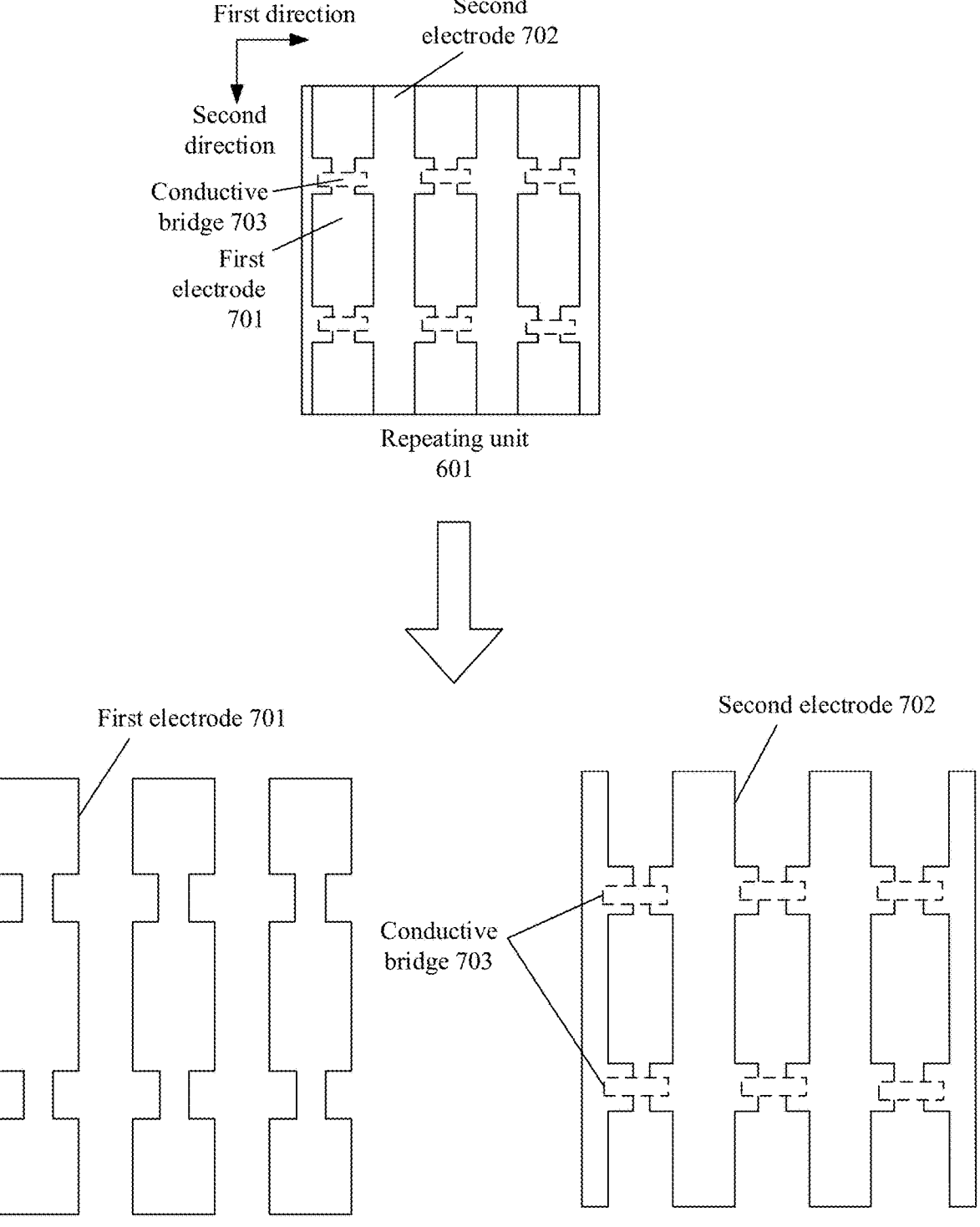
FIG. 9 is a diagram of splitting of touch electrodes in a repeating unit according to an embodiment of the present disclosure.
Figure 10:
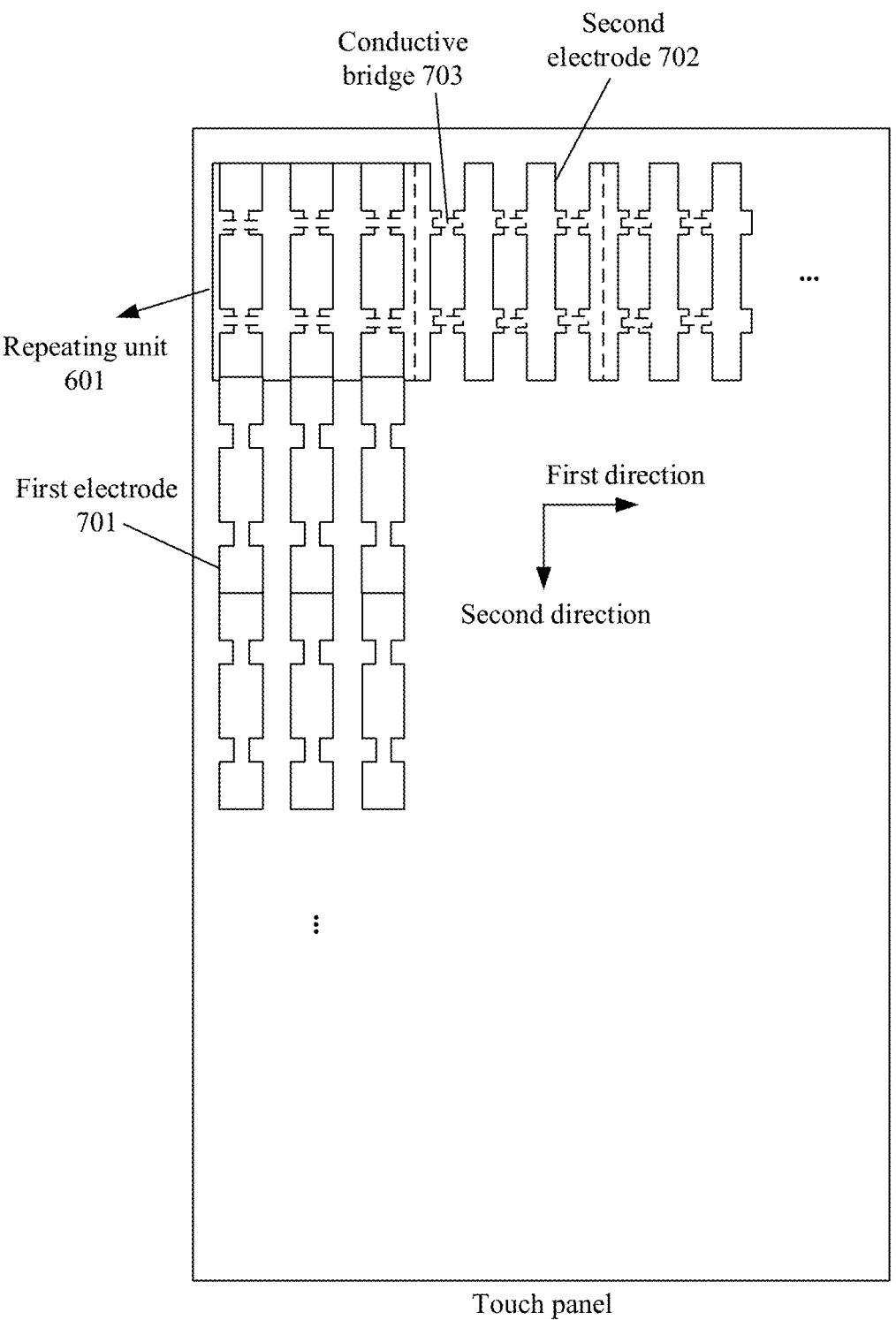
FIG. 10 is a diagram of extension of a touch electrode in a repeating unit according to an embodiment of the present disclosure.

Based on the repeating unit 601 shown in (1) in FIG. 7, for example, N=3, M=4, and a quantity of conductive bridges 703 is 6. Refer to FIG. 9 and FIG. 10. FIG. 9 is a diagram of splitting of touch electrodes in a repeating unit according to an embodiment of the present disclosure, and FIG. 10 is a diagram of extension of a touch electrode in a repeating unit according to an embodiment of the present disclosure. As shown in FIG. 9, in this embodiment of this application, one repeating unit 601 may include three first electrodes 701, four second electrodes 702, and six conductive bridges 703. The four second electrodes 702 are connected through the conductive bridges 703 in the first direction, and the three first electrodes 701 are insulated from each other. As shown in FIG. 10, first electrodes 701 in any two repeating units 601 that are adjacent in the second direction on the touch panel 500 are connected in one-to-one correspondence, and extend in the second direction; and second electrodes 702 in any two repeating units 601 that are adjacent in the first direction on the touch panel 500 are connected to each other, and extend in the first direction.

It may be understood that the four second electrodes 702 are connected through the six conductive bridges in the first direction, the conductive bridges may enable the four second electrodes 702 connected through the conductive bridges 703 in the repeating unit 601 to form a signal channel in the first direction, and the signal channel may be used to transmit a touch signal. In addition, second electrodes 702 in any two repeating units 601 that are adjacent in the first direction in the plurality of repeating units 601 are connected to each other, so that the second electrodes 702 extend in the first direction, and then the plurality of repeating units 601 distributed in an array form a plurality of signal channels in the first direction. First electrodes 701 in any two repeating units 601 that are adjacent in the second direction in the plurality of repeating units 601 are connected in one-to-one correspondence, so that the first electrodes 701 extend in the second direction, and then the plurality of repeating units 601 distributed in an array form a plurality of signal channels in the second direction. Signal channels corresponding to the first electrode 701 and the second electrode 702 on the touch panel are in two directions perpendicular to each other. For example, an extension direction of the first electrode 701 and a corresponding signal channel are in a row direction, and an extension direction of the second electrode 702 and a corresponding signal channel are in a column direction. Therefore, when a user or a touch tool performs a touch operation on the touch panel, signal channels respectively formed by the first electrode 701 and the second electrode 702 can be used to accurately determine a touch location of the user or the touch tool on the touch panel.

Optionally, M=N+1, and in the first direction, all boundaries of the repeating unit are second electrodes.

A quantity of second electrodes in the repeating unit is one more than a quantity of first electrodes, so that all boundaries of the repeating unit in the first direction are second electrodes. Then, in the plurality of repeating units arranged in an array, second electrodes in two repeating units that are adjacent in the first direction can be directly electrically connected, thereby reducing a quantity of conductive bridges, and avoiding nonuniformity of touch signals caused by a sharp area change of the electrode at a partial location. As shown in FIG. 10, in the first direction, second electrodes 702 on boundaries of the two adjacent repeating units 601 may be directly connected, thereby greatly reducing a quantity of conductive bridges 703. Similarly, in the second direction, corresponding first electrodes 701 in two adjacent repeating units 601 may also be directly connected, to ensure signal transmission performance.

Optionally, a first gap exists between the first electrode and an adjacent second electrode in the repeating unit. The first gap exists between the first electrode and the adjacent second electrode. The first gap enables the first electrode and the second electrode to be insulated from each other (that is, there is no electrical connection), and can reduce a capacitance difference between the first electrode and the second electrode, to improve uniformity of capacitive sensing between electrodes in the touch panel, thereby improving linearity of the touch tool during a slide operation on the touch panel.

Figure 11:
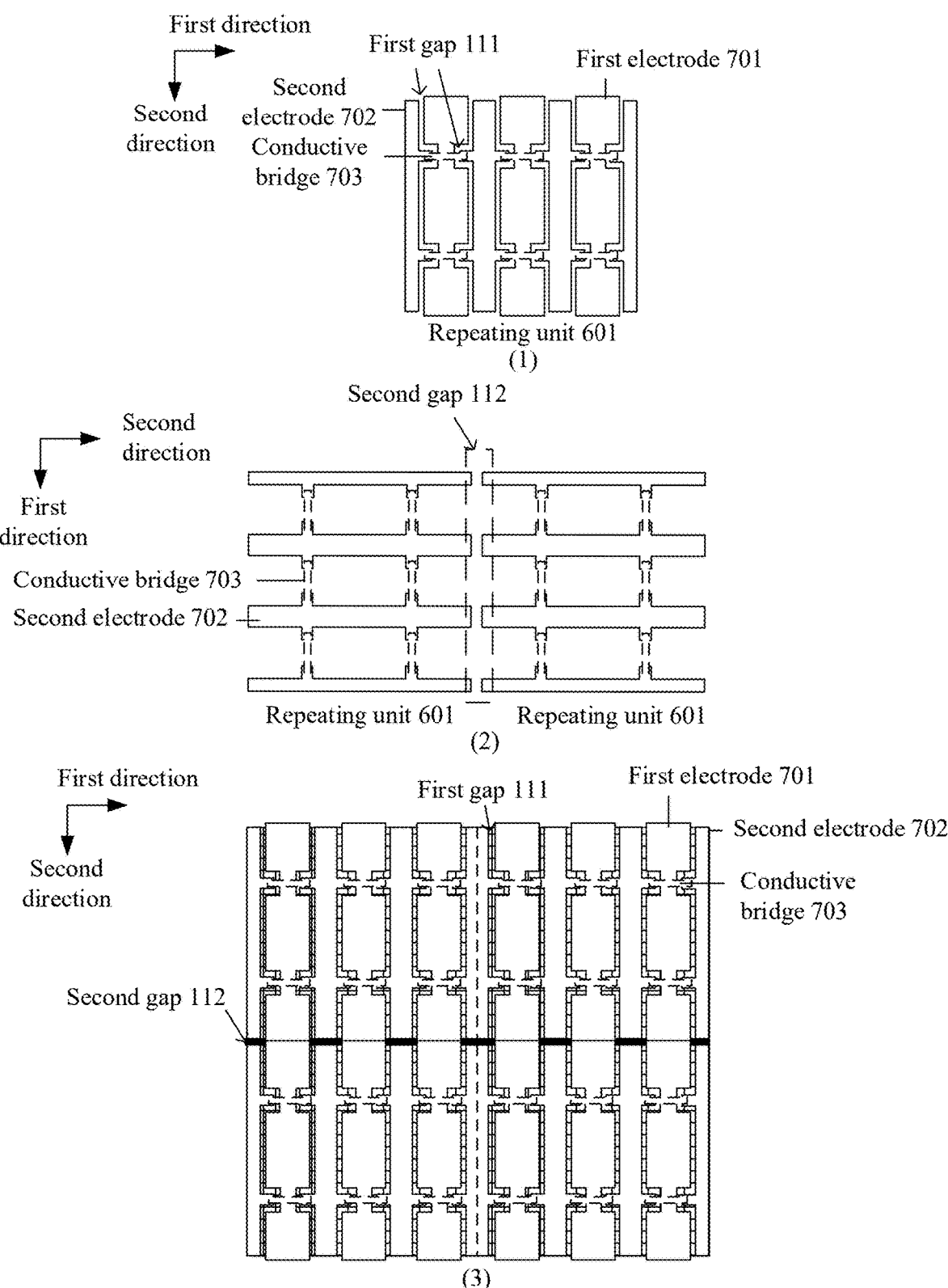
FIG. 11 is an electrode diagram of a touch electrode in another repeating unit according to an embodiment of the present disclosure.
Figure 12:
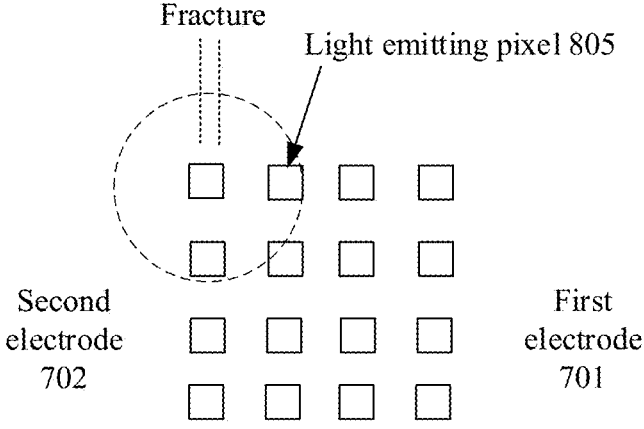
FIG. 12 is a diagram of a metal grid with a fracture according to an embodiment of this application.

Refer to FIG. 11. FIG. 11 is an electrode diagram of a touch electrode in another repeating unit according to an embodiment of the present disclosure. As shown in (1) in FIG. 11, a first gap exists between a first electrode 701 and an adjacent second electrode 702 in the repeating unit 601. A part or all of the first gap 111 may be filled with an insulation medium or a metal grid 804 with a fracture (a metal grid 804 that cannot be electrically connected). A width of the first gap 111 in the first direction is less than or equal to 1000 μm, for example, is 400 μm. In addition, a filling manner and a filling material are not specifically limited in this application. For example, a gap that is in the first gap 111 and that is perpendicular to the first direction may be filled with another insulation medium whose material is different from that of the first electrode 701 and the second electrode 702, and a gap that is in the first gap 111 and that is parallel to the first direction may not be filled, or may be filled with a metal grid with a fracture. For another example, the entire first gap 111 is filled with a metal grid 804 with a fracture. The metal grid 804 shown in FIG. 8B is used as an example. Refer to FIG. 12. FIG. 12 is a diagram of a metal grid with a fracture according to an embodiment of this application. As shown in FIG. 12, the metal grid 804 has the fracture, and left and right sides of the fracture of the metal grid 804 with the fracture are insulated from each other. In addition, because a material of the metal grid 804 is consistent with the material of the first electrode 701 and the second electrode 702, process difficulty and costs of filling the first gap 111 with another insulation material are reduced. It should be noted that, to ensure touch accuracy, an opening width of the fracture in the first direction needs to be less than a side length of a corresponding light emitting pixel 805 in the first direction.

Optionally, a second gap exists between second electrodes in the repeating units that are adjacent in the second direction in the plurality of repeating units. The second gap exists between the second electrodes in the two repeating units that are adjacent in the second direction. The gap may enable insulation between the second electrodes in the two repeating units that are adjacent in the second direction, thereby increasing a quantity of electrode channels, in the second direction, of the plurality of repeating units arranged in an array (that is, a quantity of signal channels corresponding to the second electrode in the second direction). A part or all of the second gap may be filled with an insulation medium or a metal grid with a fracture (a metal grid that cannot be electrically connected). A width of the second gap in the second direction is less than or equal to 1000 μm, for example, is 400 μm.

The second gap exists between the second electrodes in the two repeating units that are adjacent in the second direction. As shown in (2) in FIG. 11, in the second direction, a second gap 112 exists between M second electrodes 702 and M second electrodes 702. Similar to the first gap 111 shown in (1) in FIG. 11, a part or all of the second gap 112 may be filled with an insulation medium or a metal grid with a fracture. Details are not described in this embodiment of this application.

As shown in (3) in FIG. 11, when the repeating units 601 are arranged in an array, the first gap 111 enables the first electrode 701 and the second electrode 702 to be insulated from each other, thereby reducing a capacitance difference between the first electrode 701 and the second electrode 702; and the second gap 112 may enable insulation between second electrodes 702 in two repeating units 601 that are adjacent in the second direction, thereby increasing a quantity of signal channels corresponding to the second electrodes 702, in the second direction, of the plurality of repeating units 601 arranged in an array. That the first electrode 701 and the second electrode 702 are insulated from each other means that there is no electrical connection.

Figure 13A:
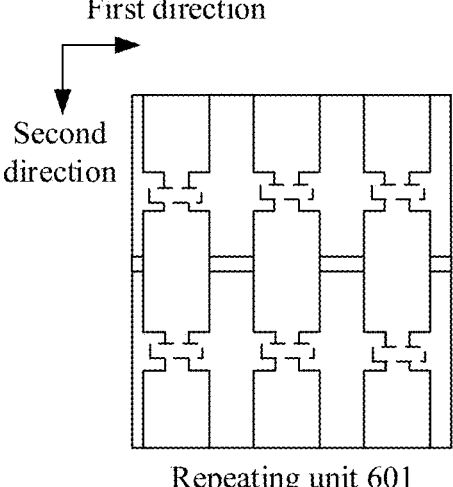
FIG. 13A is an electrode diagram of touch electrodes in several other types of repeating units according to an embodiment of the present disclosure.
Figure 13A:
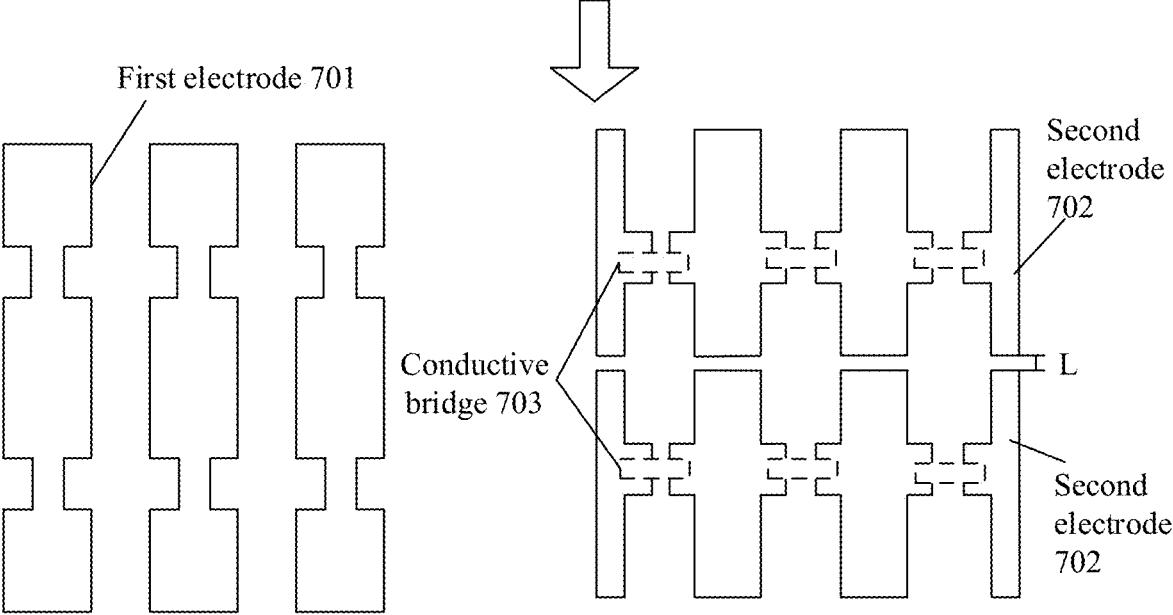

Therefore, as shown in the embodiment, the first electrode 701 and the second electrode 702 in the repeating unit 601 are alternately arranged in the first direction, that is, one first electrode 701 is adjacent to two second electrodes 702, and the two second electrodes 702 are connected through at least one conductive bridge. Therefore, for one repeating unit 601, in an electrode extension direction, N first electrodes 701 may correspond to N signal channels, and M second electrodes 702 may correspond to only one signal channel, as shown in FIG. 10. Therefore, to increase a quantity of signal channels corresponding to the second electrode 702 in the second direction, when the first electrode 701 and the second electrode 702 in the repeating unit 601 are alternately arranged in the first direction, the second electrode 702 may be arranged in the second direction. Refer to FIG. 13A. FIG. 13A is an electrode diagram of touch electrodes in several other types of repeating units according to an embodiment of the present disclosure. As shown in FIG. 13A, when the first electrode 701 and the second electrode 702 in the repeating unit 601 are alternately arranged in the first direction, one first electrode 701 and R second electrodes 702 may be alternately arranged in the first direction, and the R second electrodes 702 are insulated from each other. R is greater than or equal to 1, and M is an integer multiple of N and R. Correspondingly, adjacent second electrodes 702 corresponding to the M first electrodes 701 are connected to each other through the conductive bridge 703, to form R signal channels in the first direction. As shown in FIG. 13A, two second electrodes 702 are included between two adjacent first electrodes 701, and signal channels corresponding to the two second electrodes 702 are correspondingly formed in the first direction by the second electrodes 702. This is not specifically limited in this embodiment of this application. In addition, it should be further noted that a length between two adjacent second electrodes 702 in the second direction is less than or equal to 1000 μm, for example, L is less than or equal to 1000 μm.

Optionally, the first electrode includes a plurality of first convex portions and a plurality of first concave portions, and the second electrode includes a plurality of second convex portions and a plurality of second concave portions. The first convex portion and the second concave portion are disposed in correspondence, the first concave portion and the second convex portion are disposed in correspondence, every two adjacent first convex portions in the first electrode are connected through one first concave portion, and every two adjacent second concave portions in the second electrode are connected through one second convex portion.

Figure 13B:
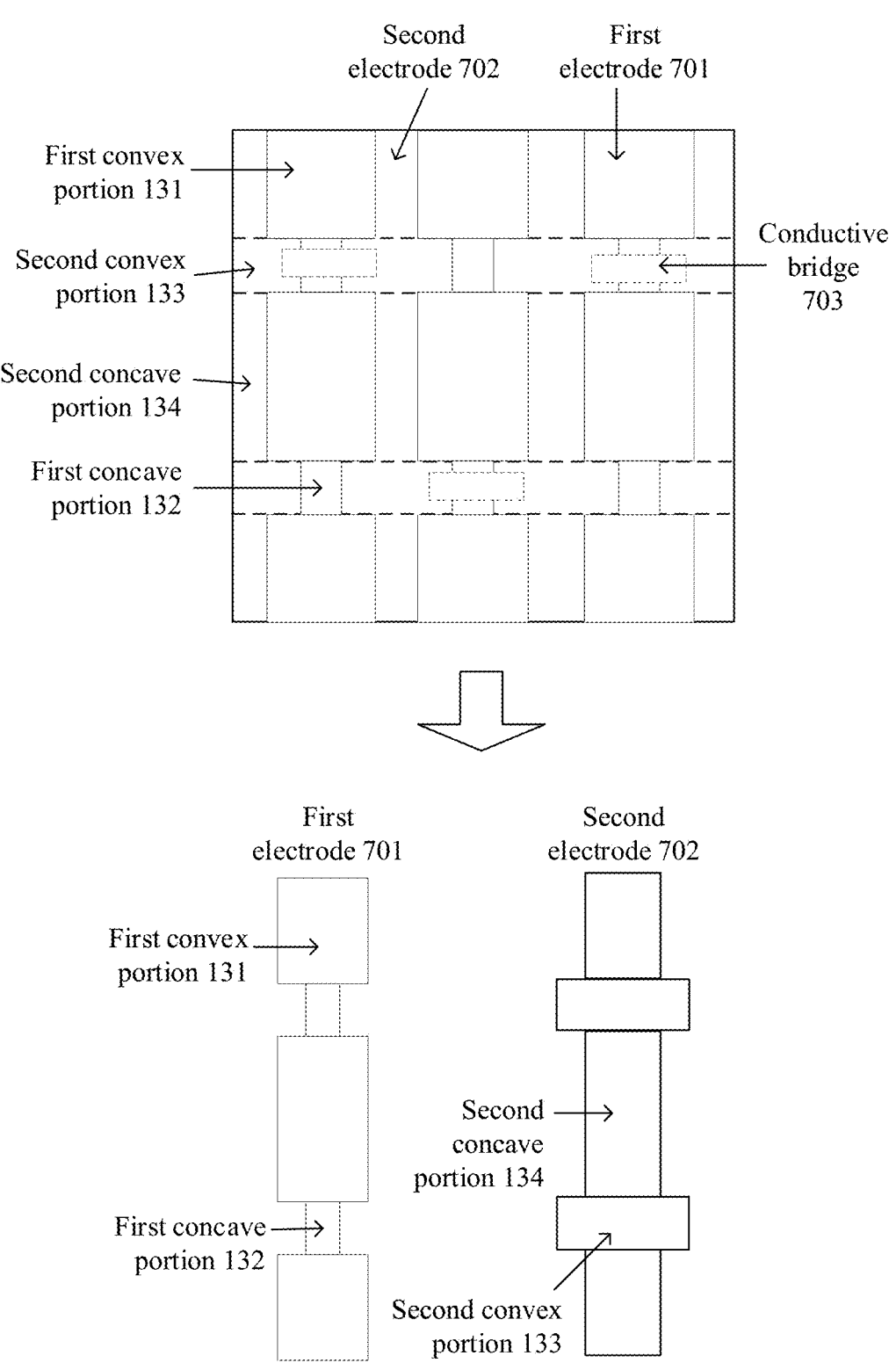
FIG. 13B is a diagram of a structure of a touch electrode in a repeating unit according to an embodiment of the present disclosure.

Refer to FIG. 13B. FIG. 13B is a diagram of a structure of a touch electrode in a repeating unit according to an embodiment of the present disclosure. As shown in FIG. 13B, the first electrode 701 and the second electrode 702 in the repeating unit 601 are correspondingly provided with convex portions and concave portions. For example, the first electrode 701 includes a plurality of first convex portions 131 and a plurality of first concave portions 132, and the second electrode 702 includes a plurality of second convex portions 133 and a plurality of second concave portions 134. In this way, the first electrode 701 and the second electrode 702 are evenly distributed in the repeating unit in a sawtooth shape, and both the first electrode 701 and the second electrode 702 are in an axisymmetric structure, thereby ensuring uniformity of capacitive sensing of the touch panel 500. In addition, to prevent a sharp change in electrode areas in different directions in the repeating unit 601, the conductive bridge 703 is usually configured to connect second convex portions 133 corresponding to two second electrodes 702 that are adjacent in the first direction in the M second electrodes 702 in the repeating unit 601.

It should be noted that quantities of first convex portions 131 and second concave portions 134 and/or quantities of first concave portions 132 and second convex portions 133 are not specifically limited in this application.

Figure 14A:
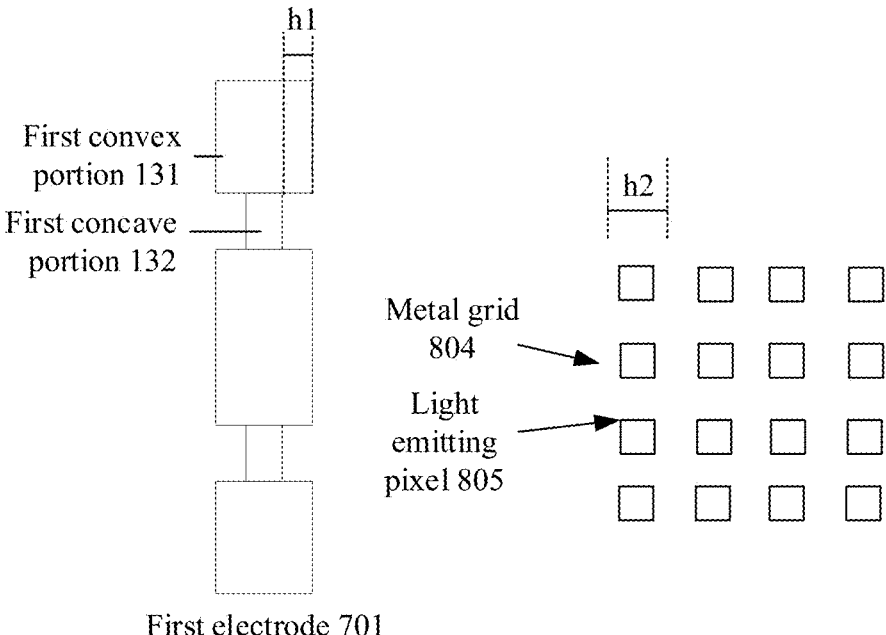
FIG. 14A is a diagram of a first electrode according to an embodiment of the present disclosure.

It should be further noted that, in some possible embodiments, when both the first electrode 701 and the second electrode 702 are metal electrodes, a width of a protrusion part of the first convex portion 131 of the first electrode 701 compared with the first concave portion 132 in the first direction is less than or equal to 10 times a width of a metal strip of the metal grid 804 in the first direction. Alternatively, a width of a protrusion part of the first convex portion 131 of the first electrode 701 compared with the first concave portion 132 in the first direction is less than or equal to 10 times a distance between centers of two adjacent light emitting pixels 805 in the first direction. Refer to FIG. 14A. FIG. 14A is a diagram of a first electrode according to an embodiment of the present disclosure. As shown in FIG. 14A, h1 is a width of a protrusion part of the first convex portion 131 of the first electrode 701 compared with the first concave portion 132 in the first direction, and h2 is a width of the metal grid 804 in the first direction. Therefore, h1 is less than or equal to 10*h2. In addition, h2 may alternatively be a distance between centers of two adjacent light emitting pixels 805 in the first direction. If distances between different adjacent light emitting pixels 805 are unequal, a largest value is used.

Optionally, the first convex portion and the second concave portion and/or the first concave portion and the second convex portion are rectangular. The first convex portion and the second concave portion and/or the first concave portion and the second convex portion are correspondingly set to be rectangular, as shown in related embodiments in FIG. 6 to FIG. 13A. Compared with that of a rhombic electrode, a sharp change in an electrode area is avoided, uniformity of capacitive sensing in an electrode extension direction is improved, and linearity of a touch tool is improved.

Figure 14B:
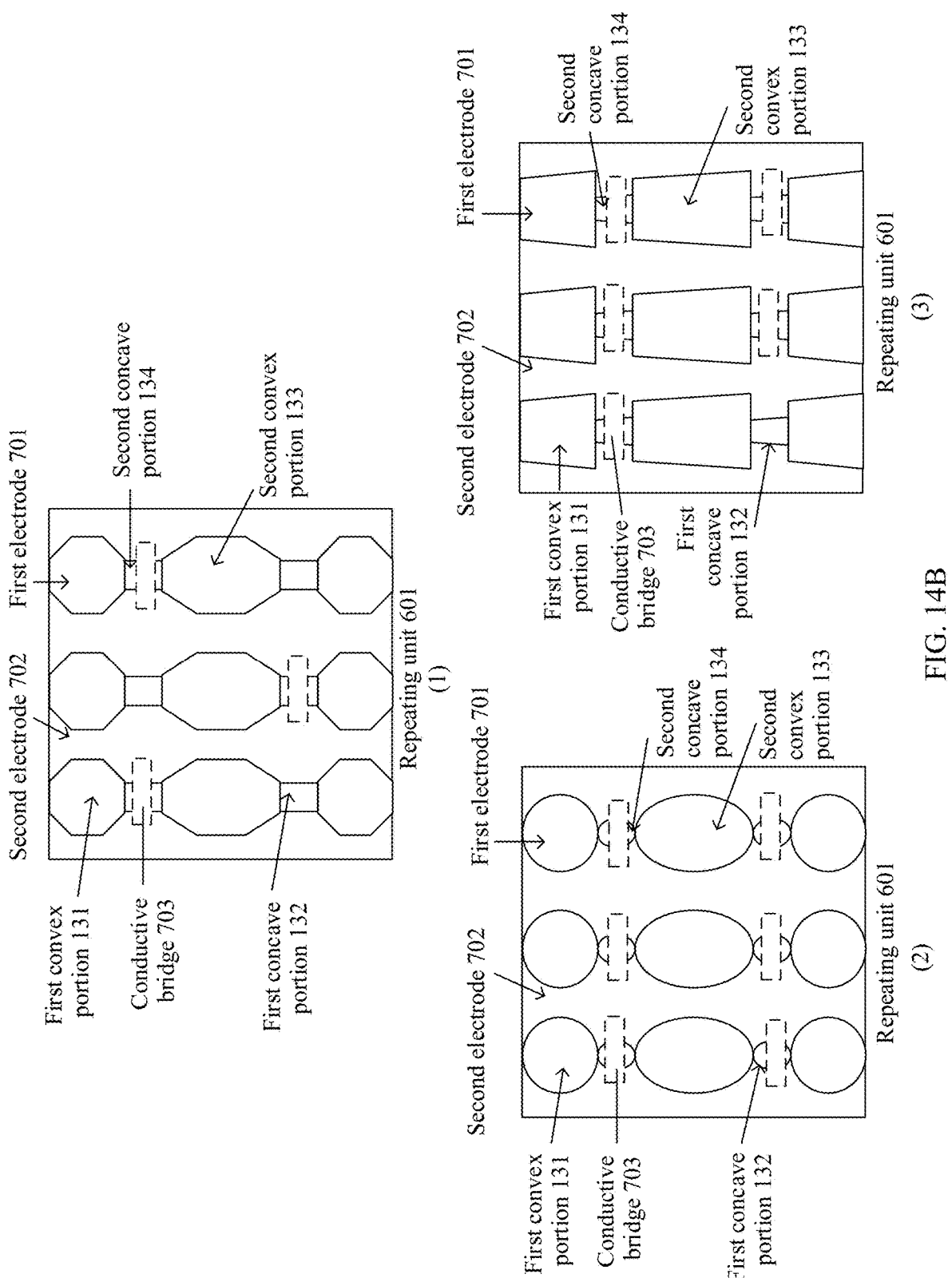
FIG. 14B is an electrode diagram of touch electrodes in several other types of repeating units according to an embodiment of this application.

In some other possible implementations, the first convex portion and the second concave portion and/or the first concave portion and the second convex portion may alternatively be in a rhombic shape, a triangular shape, a circular shape, an elliptic shape, a polygonal shape, or another irregular shape. A shape is not specifically limited in this application. Refer to FIG. 14B. FIG. 14B is an electrode diagram of touch electrodes in several other types of repeating units according to an embodiment of this application. As shown in (1) in FIG. 14B, both the first convex portion 131 of the first electrode 701 and the second convex portion 133 of the second electrode 702 in the repeating unit 601 are octagonal, and both the first concave portion 132 of the first electrode 701 and the second concave portion 134 of the second electrode 702 are rectangular. As shown in (2) in FIG. 14B, both the first convex portion 131 of the first electrode 701 and the first concave portion 132 of the first electrode 701 in the repeating unit 601 are elliptic, and both the second convex portion 133 of the second electrode 702 and the second concave portion 134 of the second electrode 702 are in irregular shapes, and are complementary with the first convex portion 131 of the corresponding first electrode 701 and the first concave portion 132 of the first electrode 701. As shown in (3) in FIG. 14B, both the first convex portion 131 of the first electrode 701 and the second convex portion 133 of the second electrode 702 in the repeating unit 601, and both the first concave portion 132 of the first electrode 701 and the second concave portion 134 of the second electrode 702 are trapezoidal.

In addition, it should be noted that, for sizes of the first electrode 701 and the second electrode 702, widths of the first concave portion 132 of the first electrode 701 and the second convex portion 133 of the second electrode 702 in the second direction are equal, and are both less than or equal to 1000 μm; and a width of the first convex portion 131 of the first electrode 701 in the first direction is less than a half of the width of the repeating unit 601 in the first direction.

Optionally, one or more branch electrodes that are locally electrically connected may further exist between any two adjacent first electrodes in the N first electrodes in the repeating unit. In an extension direction of the first electrode, a width a of the one or more branch electrodes that are locally electrically connected is less than or equal to 1000 μm, and the extension direction of the first electrode is the second direction. One or more branch electrodes that are locally electrically connected may further exist between second electrodes in two repeating units that are adjacent in the second direction in the plurality of repeating units. In an extension direction of the second electrode, a width b of the one or more branch electrodes that are locally electrically connected is less than or equal to 1000 μm, and the extension direction of the second electrode is the first direction. It may be understood that a width of the branch electrode in the extension direction of the electrode is less than or equal to 1000 μm, so that transmission of a touch signal may not be affected when an area of the branch electrode is excessively large.

Optionally, in the first electrode, the plurality of first convex portions have a same width in the first direction, and the plurality of first concave portions have a same width in the first direction; and in the second electrode, the plurality of second convex portions have a same width in the first direction, and the plurality of second concave portions have a same width in the first direction. The plurality of first convex portions have the same width in the first direction, and the plurality of first concave portions have the same width in the first direction. In the second electrode, the plurality of second convex portions have the same width in the first direction, and the plurality of second concave portions have the same width in the first direction. In this way, both the first electrode and the second electrode are strip-shaped electrodes, thereby improving touch signal consistency between the first electrode and the second electrode. It should be noted that the widths in this embodiment of this application are largest widths of the first convex portion, the first concave portion, the second convex portion, and the second concave portion in the first direction.

Optionally, a width of at least one of the N first electrodes is different from a width of a remaining first electrode, and the width is the width of the plurality of first convex portions corresponding to the first electrode in the first direction. Widths of the N first electrodes are not completely consistent. In the first direction, a width corresponding to a first electrode far away from a boundary of the repeating unit is usually less than a width corresponding to a first electrode close to the boundary of the repeating unit. Setting the width of the electrode can improve an envelope shape when the touch tool slides on the touch panel. This helps improve writing effect of the touch tool such as an active stylus on the touch panel.

Optionally, a width of at least one of the M second electrodes is different from a width of a remaining second electrode, and the width is the width of the plurality of second concave portions corresponding to the second electrode in the first direction. Widths of the M second electrodes are not completely consistent. In the first direction, a width corresponding to a second electrode far away from a boundary of the repeating unit is usually greater than a width corresponding to a second electrode close to the boundary of the repeating unit. Setting the width of the electrode can improve an envelope shape when the touch tool slides on the touch panel. This improves linearity of the touch tool such as an active stylus during sliding on the touch panel.

In a possible implementation, N=3, M=4, the N first electrodes include a first electrode S1, a first electrode S2, and a first electrode S3, and the M second electrodes include a second electrode K1, a second electrode K2, a second electrode K3, and a second electrode K4. The second electrode K1, the second electrode K2, the second electrode K3, and the second electrode K4 are alternately arranged with the first electrode SI, the first electrode S2, and the first electrode S3 in sequence in the first direction. A width of the first electrode S2 is less than a width of the second electrode K2, the width of the second electrode K2 is equal to a width of the second electrode K3, the width of the second electrode K3 is less than a width of the first electrode S1, and the width of the first electrode S1 is equal to a width of the first electrode S3. A sum of a width of the second electrode K1 and a width of the second electrode K4 is greater than the width of the first electrode S1, or a sum of a width of the second electrode K1 and a width of the second electrode K4 is equal to the width of the second electrode K3.

Figure 15:
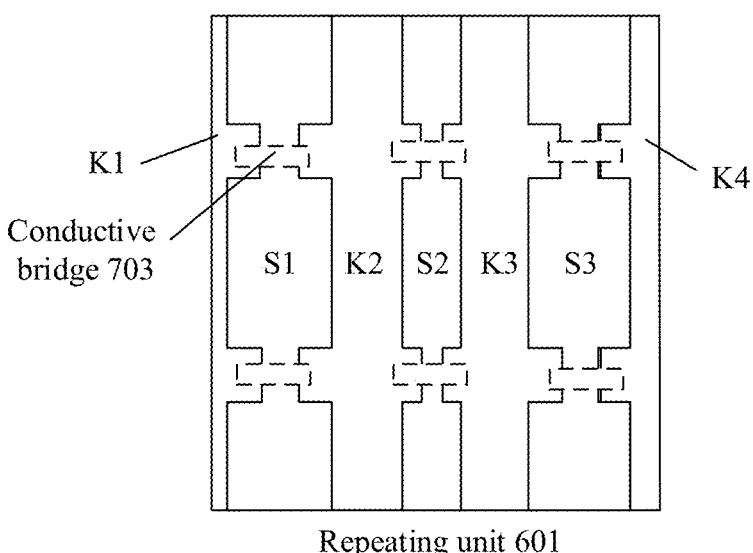
FIG. 15 is an electrode diagram of a touch electrode in another repeating unit according to an embodiment of the present disclosure.

Refer to FIG. 15. FIG. 15 is an electrode diagram of a touch electrode in another repeating unit according to an embodiment of the present disclosure. As shown in FIG. 15, three first electrodes and four second electrodes are alternately arranged in sequence, that is, a second electrode K1, a first electrode S1, a second electrode K2, a first electrode S2, a second electrode K3, a first electrode S3, and a second electrode K4. A width corresponding to the first electrode S2 far away from a boundary in the first direction is less than widths corresponding to the first electrode S1 and the first electrode S3 close to the boundary in the first direction, and widths corresponding to the second electrode K1 and the second electrode K2 far away from a boundary in the first direction are greater than widths corresponding to the second electrode K3 and the second electrode K4 close to the boundary in the first direction. Setting the widths of the first electrode and the second electrode can improve an envelope shape when the touch tool slides on the touch panel. This helps improve writing effect of the touch tool such as an active stylus on the touch panel.

It should be noted that the widths mentioned in this embodiment are largest widths of the first convex portion of the first electrode and the second concave portion of the second electrode in the first direction.

In the conventional technology, a contact area between an active stylus and a touch electrode in a touch panel is far less than a contact area between a finger of a user and a touch electrode. In addition, the current touch electrode has a sharp size change and electrode area change in an electrode extension direction (for example, in a horizontal or vertical direction along a screen) in the touch panel, causing uneven distribution of touch signals. Consequently, linearity of the active stylus is poor, and touch effect is affected. The touch electrode includes the first electrode and the second electrode. Therefore, in embodiments of this application, the touch panel includes the plurality of repeating units arranged in an array, and the repeating unit may be understood as a minimum repeating touch unit in the touch panel. The repeating unit includes a plurality of first electrodes and a plurality of second electrodes that are alternately arranged in a first direction. A quantity of first electrodes and a quantity of second electrodes are both greater than or equal to 3, and the first electrodes and the second electrodes are alternately arranged, so that different electrodes in the repeating unit can be alternately and evenly distributed. This avoids a sharp size change and electrode area change of a rhombic touch electrode in an electrode extension direction. Therefore, signal uniformity of a touch tool during touch is improved, and linearity of the touch tool is improved. In addition, M second electrodes in the repeating unit are connected through a conductive bridge in the first direction, the conductive bridge may enable the M second electrodes connected through the conductive bridge in the repeating unit to form a signal channel in the first direction, and the signal channel may be used to transmit a touch signal. In addition, second electrodes in any two repeating units that are adjacent in the first direction in the plurality of repeating units are connected to each other, so that the second electrodes extend in the first direction, and then the plurality of repeating units distributed in an array form a plurality of signal channels in the first direction. First electrodes in any two repeating units that are adjacent in the second direction in the plurality of repeating units are connected in one-to-one correspondence, so that the first electrodes extend in the second direction, and then the plurality of repeating units distributed in an array form a plurality of signal channels in the second direction. Signal channels corresponding to the first electrode and the second electrode on the touch panel are in two directions perpendicular to each other. For example, an extension direction of the first electrode and a corresponding signal channel are in a row direction, and an extension direction of the second electrode and a corresponding signal channel are in a column direction. Therefore, electrodes (that is, signal channels) in different extension directions on the touch panel may be used to accurately determine a touch location of a user or a touch tool on the touch panel.

In the foregoing embodiments, descriptions of the embodiments have respective focuses. For a part that is not described in detail in an embodiment, refer to related descriptions in other embodiments.

It should be noted that, for brief description, the foregoing method embodiments are expressed as a series of action combinations. However, a person skilled in the art should appreciate that this application is not limited to the described order of the actions, because according to this application, some steps may be performed in other orders or simultaneously. In addition, a person skilled in the art should also appreciate that all embodiments described in the specification are embodiments, and the related actions and modules are not necessarily mandatory to this application.

In the several embodiments provided in this application, it should be understood that the disclosed apparatus may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in embodiments of this application.

The invention claimed is:

1. A touch panel, comprising a plurality of repeating units arranged in an array, wherein each repeating unit comprises N first electrodes and M second electrodes, the N first electrodes and the M second electrodes are alternately arranged in a first direction, and both N and M are integers greater than or equal to 3;

wherein in a second direction perpendicular to the first direction, first electrodes in first adjacent repeating units of the plurality of repeating units are connected in one-to-one correspondence; and wherein in the first direction, the M second electrodes in the repeating unit are connected through a conductive bridge, and second electrodes on boundaries of second adjacent repeating units that of the plurality of repeating units and are adjacent in the first direction are connected to each other;

wherein each first electrode comprises a plurality of first convex portions and a plurality of first concave portions, and each second electrode comprises a plurality of second convex portions and a plurality of second concave portions; and the plurality of first convex portions and the plurality of second concave portions are disposed in correspondence, the plurality of first concave portions and the plurality of second convex portions are disposed in correspondence, every two adjacent first convex portions in the first electrode are connected through one first concave portion, and every two adjacent second concave portions in the second electrode are connected through one second convex portion.

2. The panel according to claim 1, wherein M=N+1, and in the first direction, a boundary of the repeating unit is one of the M second electrodes.

3. The panel according to claim 1, wherein the N first electrodes and the M second electrodes are metal grid electrodes.

4. The panel according to claim 1, wherein a first gap exists between each first electrode in the repeating unit and its adjacent second electrode in the repeating unit.

5. The panel according to claim 1, wherein a second gap exists between second electrodes of the first adjacent repeating units of the plurality of repeating units.

6. The panel according to claim 1, wherein the first direction comprises a column direction or a row direction.

7. The panel according to claim 1, wherein the plurality of first convex portions and the plurality of second concave portions are rectangular; and/or wherein the plurality of first concave portions and the plurality of second convex portions are rectangular.

8. The panel according to claim 1, wherein in each first electrode, the plurality of first convex portions have a same width in the first direction, and the plurality of first concave portions have a same width in the first direction; and wherein in each second electrode, the plurality of second convex portions have a same width in the first direction, and the plurality of second concave portions have a same width in the first direction.

9. The panel according to claim 1, wherein a width of at least one of the N first electrodes is different from a width of a remaining first electrode, and the width of the first electrode is the width of the plurality of first convex portions in the first direction.

10. The panel according to claim 9, wherein a width of at least one of the M second electrodes is different from a width of a remaining second electrode, and the width of the second electrode is the width of the plurality of second concave portions in the first direction.

11. The panel according to claim 10, wherein N=3, M=4, the N first electrodes comprise a first electrode S1, a first electrode S2, and a first electrode S3, and the M second electrodes comprise a second electrode K1, a second electrode K2, a second electrode K3, and a second electrode K4;

the second electrode K1, the second electrode K2, the second electrode K3, and the second electrode K4 are alternately arranged with the first electrode S1, the first electrode S2, and the first electrode S3 in sequence in the first direction;

a width of the first electrode S2 is less than a width of the second electrode K2, the width of the second electrode K2 is equal to a width of the second electrode K3, the width of the second electrode K3 is less than a width of the first electrode S1, and the width of the first electrode S1 is equal to a width of the first electrode S3; and a sum of a width of the second electrode K1 and a width of the second electrode K4 is greater than the width of the first electrode S1, or a sum of a width of the second electrode K1 and a width of the second electrode K4 is equal to the width of the second electrode K3.

12. An electronic device, comprising a flexible display with a touch panel, wherein the touch panel comprises a plurality of repeating units arranged in an array, each repeating unit comprises N first electrodes and M second electrodes, the N first electrodes and the M second electrodes are alternately arranged in a first direction, and both N and M are integers greater than or equal to 3;

wherein in a second direction perpendicular to the first direction, first electrodes in first adjacent repeating units of the plurality of repeating units are connected in one-to-one correspondence; and wherein in the first direction, the M second electrodes in the repeating unit are connected through a conductive bridge, and second electrodes on boundaries of second adjacent repeating units that are of the plurality of repeating units and are adjacent in the first direction are connected to each other;

wherein each first electrode comprises a plurality of first convex portions and a plurality of first concave portions, and each second electrode comprises a plurality of second convex portions and a plurality of second concave portions; and the plurality of first convex portions and the plurality of second concave portions are disposed in correspondence, the plurality of first concave portions and the plurality of second convex portions are disposed in correspondence, every two adjacent first convex portions in the first electrode are connected through one first concave portion, and every two adjacent second concave portions in the second electrode are connected through one second convex portion.

13. The electronic device according to claim 12, wherein the electronic device further comprises an active stylus, and the active stylus is configured to perform a touch operation on the flexible display.

14. A touch system, comprising an electronic device and an active stylus, wherein the electronic device comprises a touch panel, a touch operation performed by the active stylus on the electronic device is received through the touch panel, and the touch panel comprises a plurality of repeating units arranged in an array, each repeating unit comprises N first electrodes and M second electrodes, the N first electrodes and the M second electrodes are alternately arranged in a first direction, and both N and M are integers greater than or equal to 3;

wherein in a second direction perpendicular to the first direction, first electrodes in first adjacent repeating units of the plurality of repeating units are connected in one-to-one correspondence; and wherein in the first direction, the M second electrodes in the repeating unit are connected through a conductive bridge, and second electrodes on boundaries of second adjacent repeating units that are of the plurality of repeating units and are adjacent in the first direction are connected to each other;

wherein each first electrode comprises a plurality of first convex portions and a plurality of first concave portions, and each second electrode comprises a plurality of second convex portions and a plurality of second concave portions; and the plurality of first convex portions and the plurality of second concave portions are disposed in correspondence, the plurality of first concave portions and the plurality of second convex portions are disposed in correspondence, every two adjacent first convex portions in the first electrode are connected through one first concave portion, and every two adjacent second concave portions in the second electrode are connected through one second convex portion.

* * * * *